United States Patent [19]

Grier et al.

[11] 4,348,738

[45] Sep. 7, 1982

[54] ELECTRONIC TYPOGRAPHICAL DISPLAY DEVICE WITH JUSTIFICATION FEATURE

[75] Inventors: William R. Grier, New Vernon; Francis H. Shepard, Jr., Summit; Arthur L. Arledge, Basking Ridge, all of N.J.

[73] Assignee: R & I Patent Corporation, Morristown, N.J.

[21] Appl. No.: 94,652

[22] Filed: Nov. 15, 1979

Related U.S. Application Data

[62] Division of Ser. No. 820,579, Aug. 1, 1977, which is a division of Ser. No. 622,172, Oct. 14, 1975, Pat. No. 4,054,948.

[51] Int. Cl.³ .......................... G06F 5/00; G06F 5/02
[52] U.S. Cl. ..................................................... 364/900
[58] Field of Search ... 364/200 MS File, 900 MS File

[56] References Cited

U.S. PATENT DOCUMENTS

| 3,340,012 | 11/1970 | Ehrman | 364/900 |
| 3,654,611 | 4/1972 | Bluethman et al. | 364/200 |
| 3,675,208 | 7/1972 | Bard | 364/900 |
| 3,786,429 | 1/1974 | Goldman et al. | 364/900 |

OTHER PUBLICATIONS

Encyclopedia of Electronic Circuits, by Leo Sands and Donald Mackenroth, pp. 264–265, Parker Publishing Co., West Nyack, New York, 1975.

Primary Examiner—Gareth D. Shaw
Assistant Examiner—John G. Mills
Attorney, Agent, or Firm—Burgess, Ryan and Wayne

[57] ABSTRACT

An electronic typographic apparatus includes a multi-line display, the top of the display being justified and the lower line constituting a data entry line. Coded typographic data is stored in a character memory, the dot format for the display of characters in different scan lines being produced upon application of stored character data to character generating read only memories. The data entry position of the data entry line of the display is stored and new data is entered into the character memory with counting circuits being employed to keep track of the data entry line and position. The display is "rolled up" one line upon receipt of a carriage return signal, and in the backspacing function, stored data is deleted. Backspacing may proceed into a line previously rolled up, in which case all of the lines are rolled down. The characters are displayed with proportional widths, as a function of a Character Clock signal generated from a read only memory instantaneously responsive to coded signals of the character memory just prior to the display of elements of a character. Word spaces of the top line of the display are counted to develop justification data for justifying the top display line, the justification data being stored in a separate memory and "stretching" the word spaces of the top display line by inhibiting the character clock, while the display scan continues, for the determined periods. Once justification is complete, the aforementioned determined periods are digitized and directed to the hard copy printing device to define the amount of "stretching" required. Tab stops are stored in a separate memory, and a circuit responsive to a tab signal stored in the character memory also inhibits continuation of the character clock signal until a tab stop signal is received from the tab stop memory. A special timing circuit determines when a key has been depressed for more than the normal amount of time, and then activates a gating circuit to initiate repetitive key operation.

1 Claim, 33 Drawing Figures

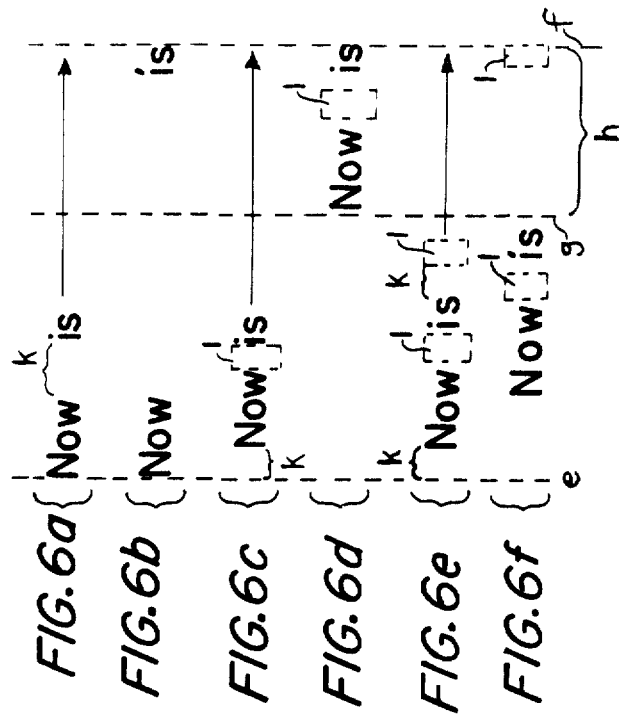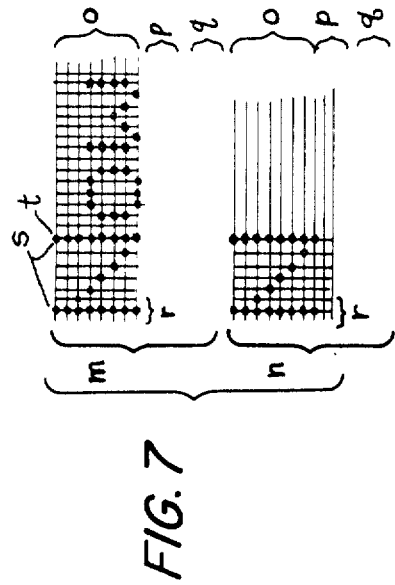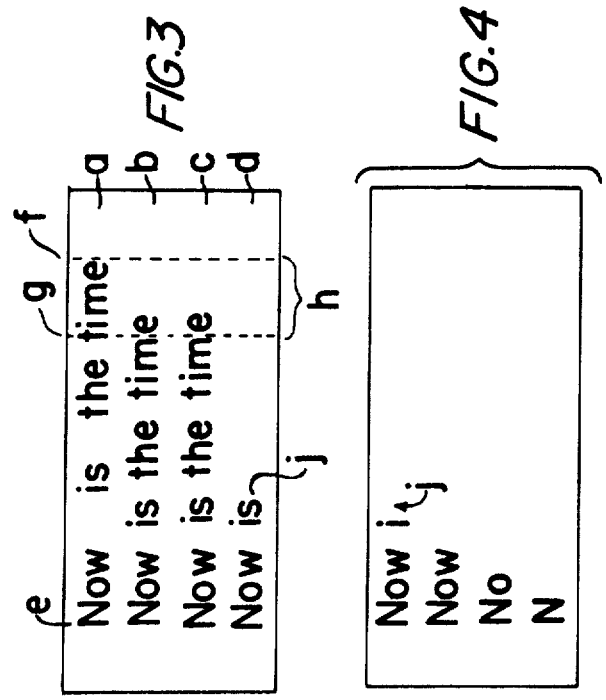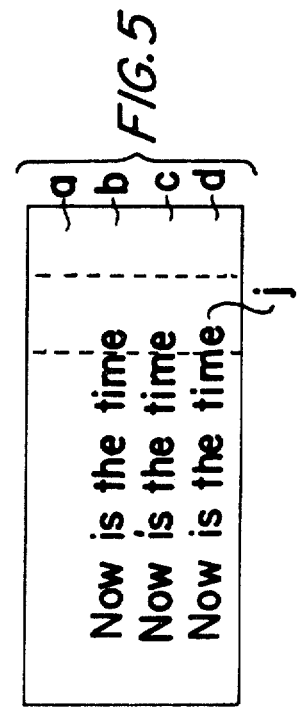

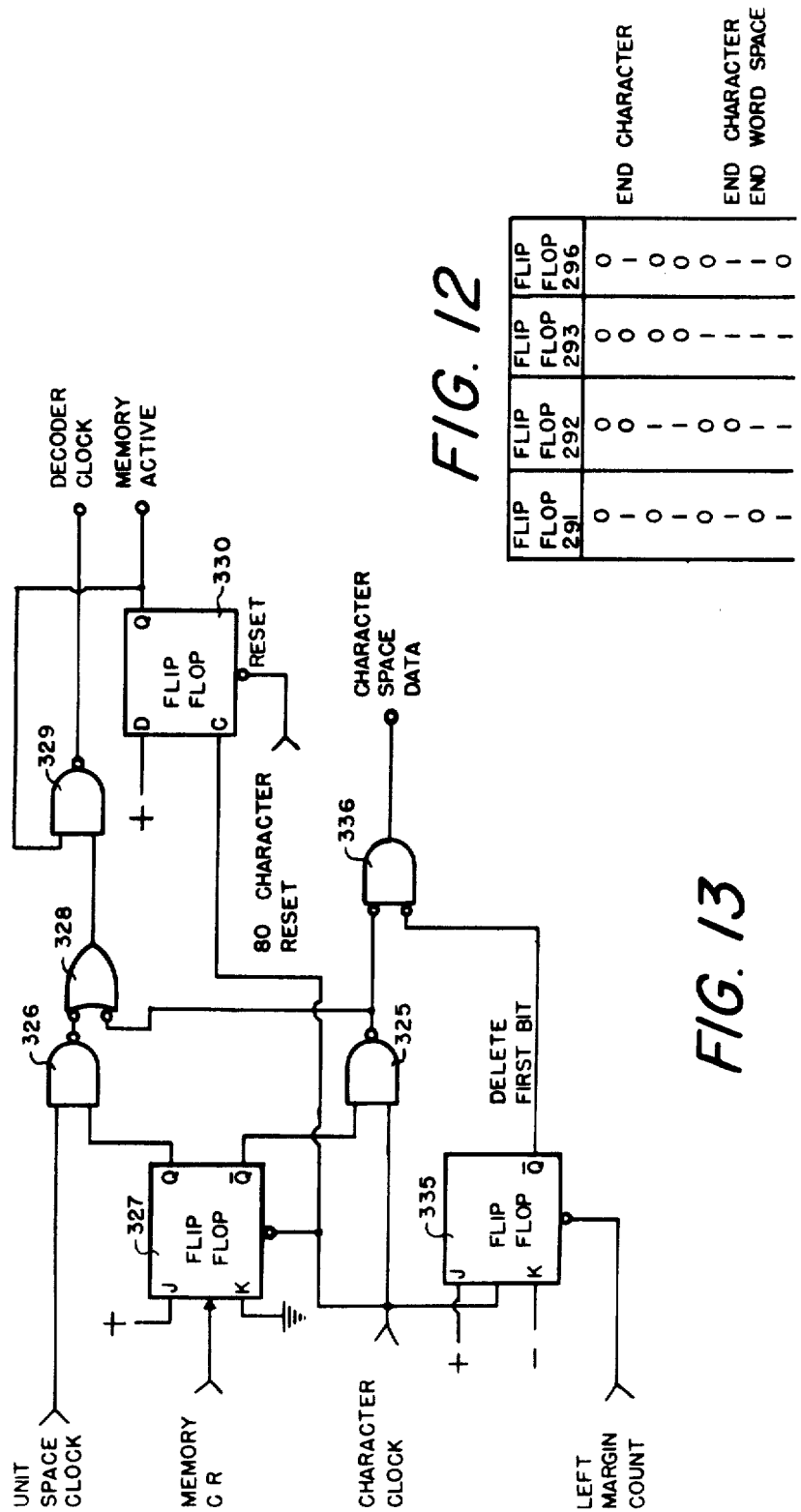

|  | CRT LINE | MEMORY CLOCK | DATA ENTRY LINE | COINCIDENCE |
|---|---|---|---|---|
| FIG. 17a. | 1<br>2<br>3<br>4 | 1<br>2<br>3<br>4 | 4<br>4<br>4<br>4 | 0<br>0<br>0<br>ENABLED |
| FIG. 17b | 1<br>2<br>3<br>4 | 4<br>1<br>2<br>3 | 3<br>3<br>3<br>3 | 0<br>0<br>0<br>ENABLED |
| FIG. 17c | 1<br>2<br>3<br>4 | 3<br>4<br>1<br>2 | 2<br>2<br>2<br>2 | 0<br>0<br>0<br>ENABLED |
| FIG. 17d | 1<br>2<br>3<br>4 | 4<br>1<br>2<br>3 | 3<br>3<br>3<br>3 | 0 [LINE PULSE BLOCKED BY ROLL DOWN COUNT DELETE]<br>0<br>0<br>ENABLED |

ELECTRONIC TYPOGRAPHICAL DISPLAY DEVICE WITH JUSTIFICATION FEATURE

This is a division, of application Ser. No. 820,579, filed Aug. 1, 1977 which is a divisional of application Ser. No. 622,172 filed Oct. 14, 1975 which is now U.S. Pat. No. 4,054,948.

BACKGROUND OF THE INVENTION

This invention relates to an electronic typographic apparatus having an electronic display upon which characters and spaces may be typed.

In the operation of such electronic typing equipment, it is desirable to enable any desired character or space (or backspace) key to automatically repeat its function. On some conventional typewriters, this repetition capability is provided for a limited number of keys, by means of a pressure-sensitive mechanical arrangement, so that application of less than a given amount of pressure results in a single operation of the key, while exertion of an increased pressure results in repetitive key operation.

However, such prior art arrangements require the operator to carefully control the pressure applied, which results in reduced typing speed and an increase in errors.

Accordingly, an object of the present invention is to provide, in an electronic typographic apparatus, a key repetition capability which overcomes the aforementioned disadvantages, and which can provide capability for repetitive operation of any key, with relatively little complexity.

IN THE DRAWINGS

FIG. 3 is an illustration of the display panel of the apparatus of FIG. 1, illustrating the functions of the lines of the display;

FIG. 4 illustrates a backspacing sequence for the display panel;

FIG. 5 illustrates a roll down of the display of FIG. 3;

Figure 1:
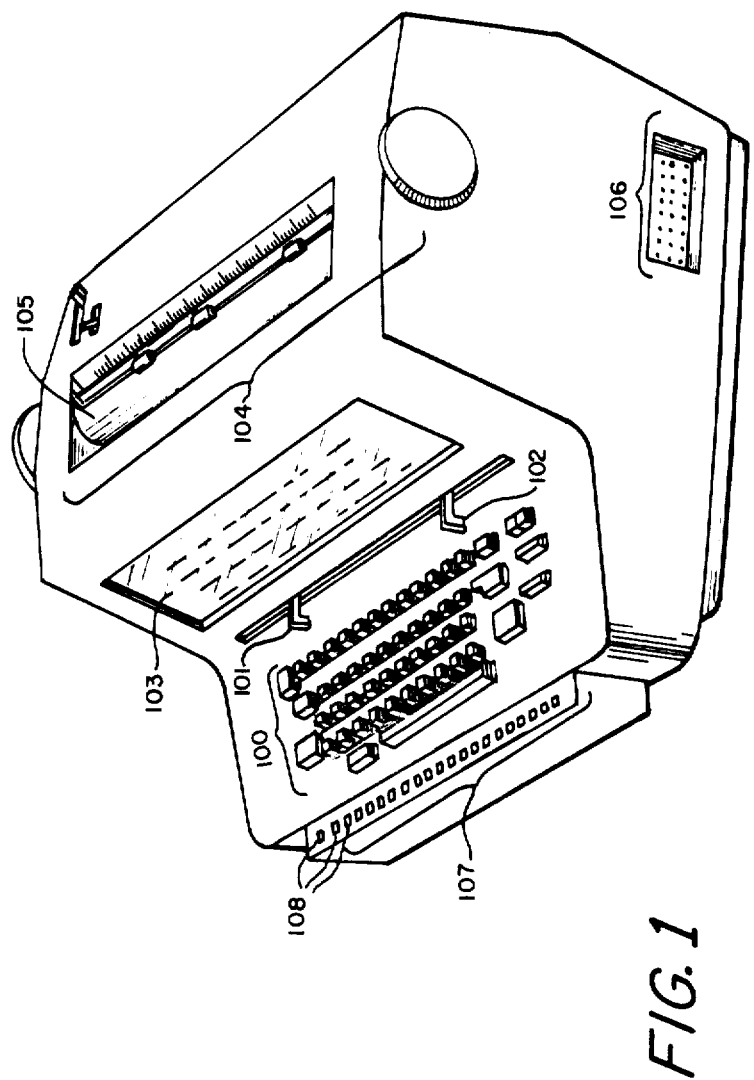
FIG. 1 is a perspective view of a typographic apparatus in accordance with the invention.
Figure 8:
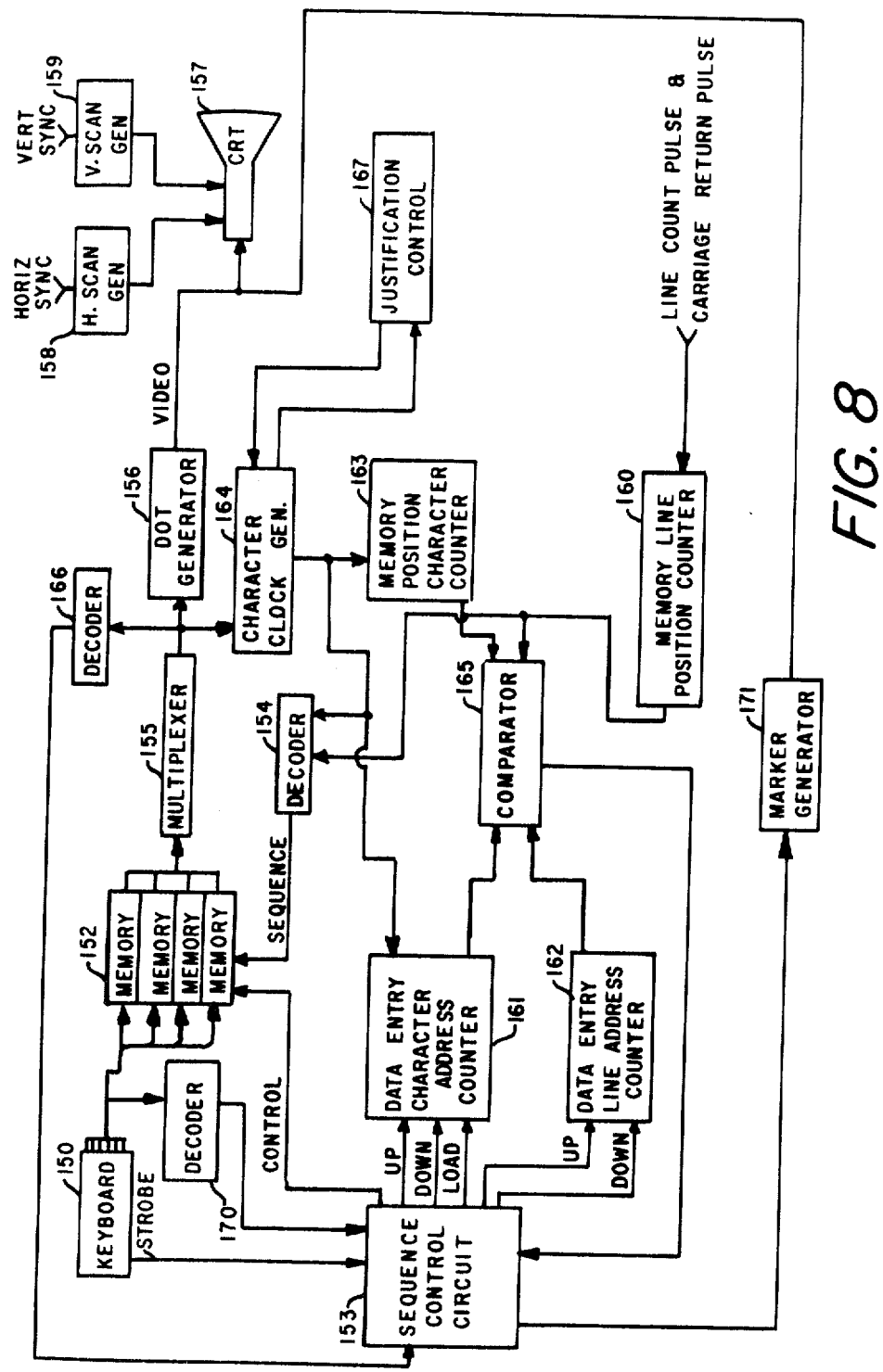
Figure 9:
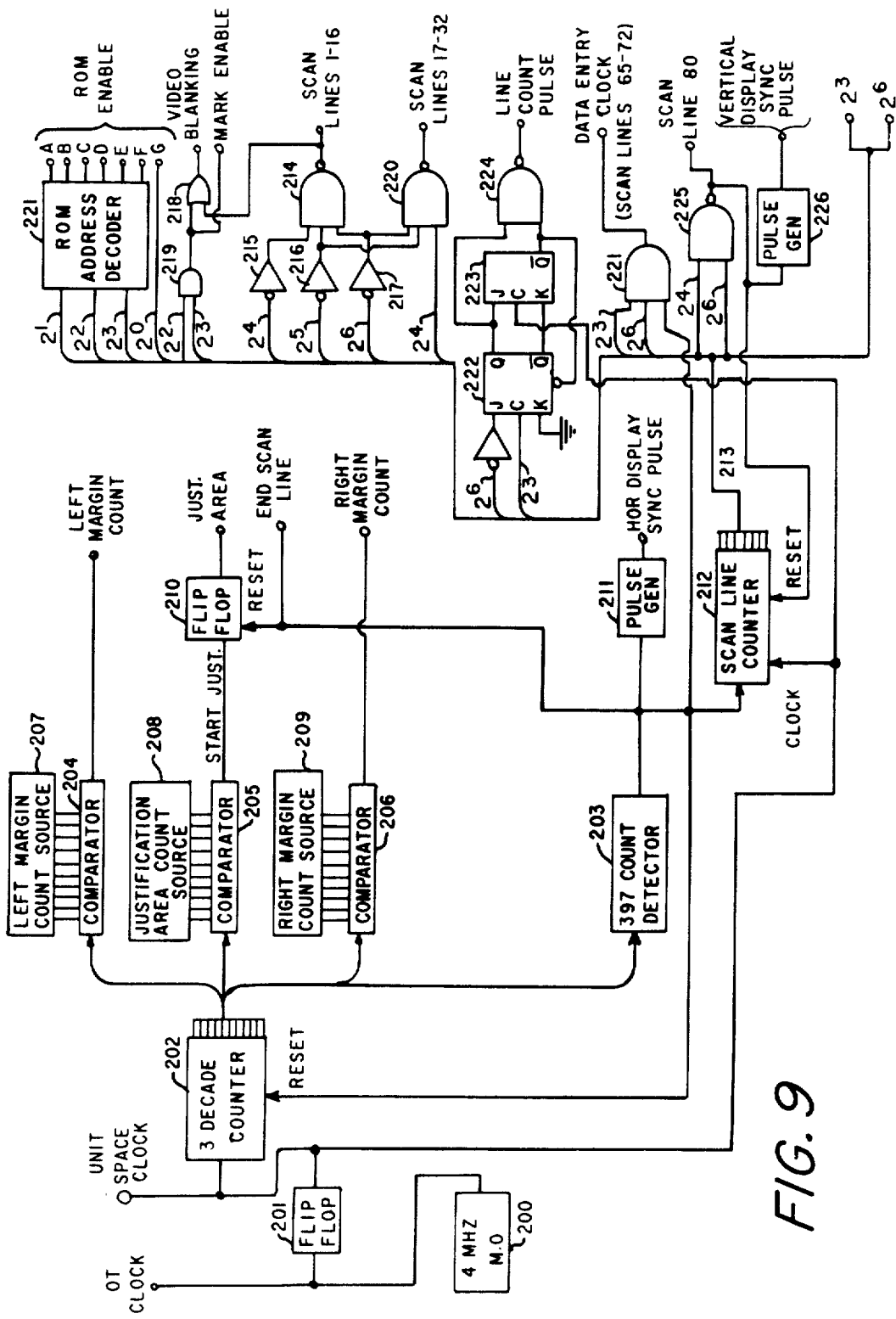
Figure 10:
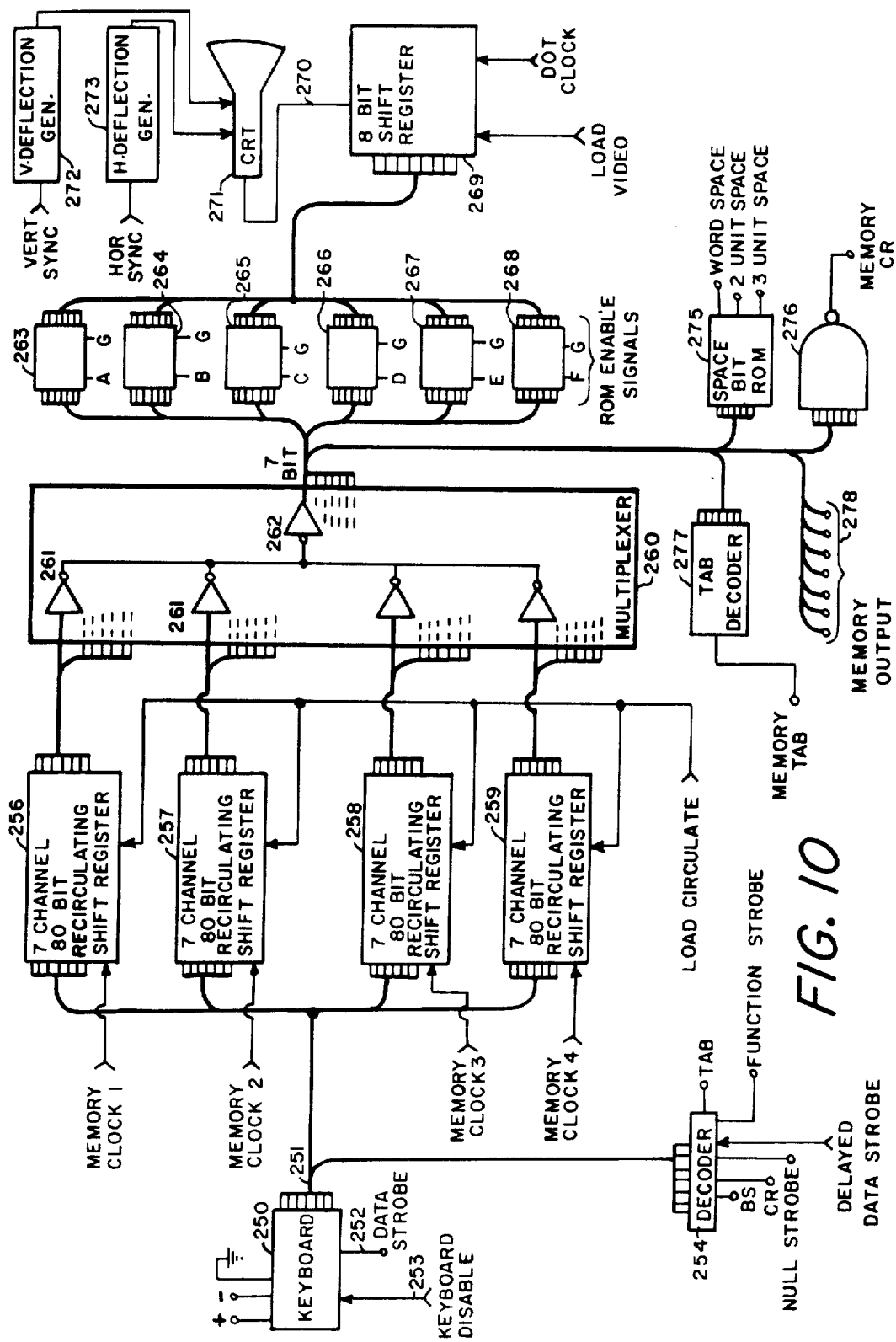
Figure 11:
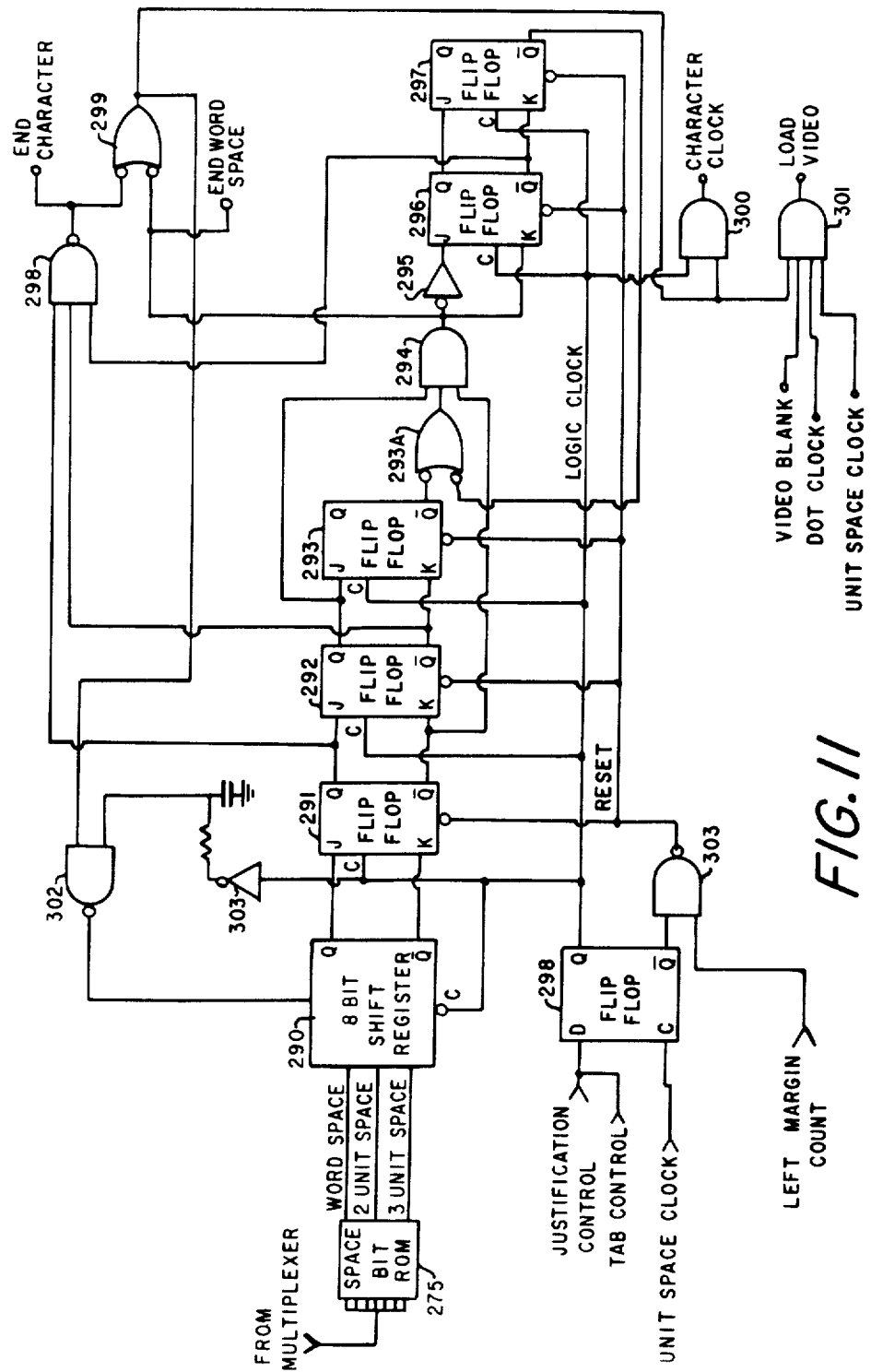
Figure 14:
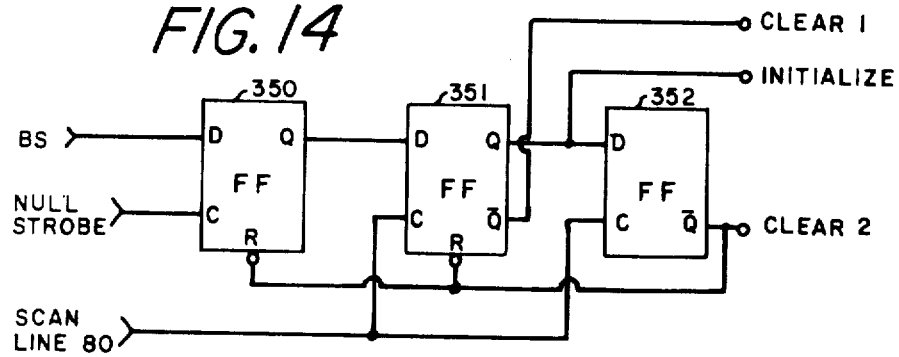
Figure 15:
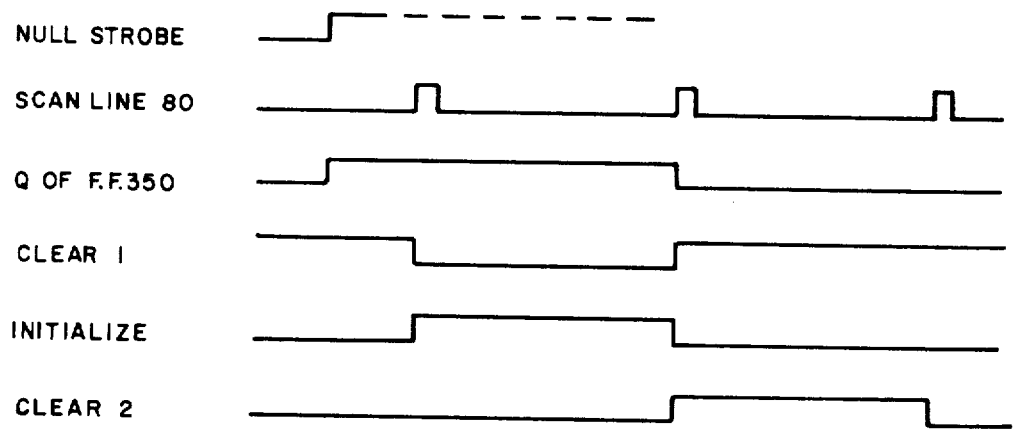
Figure 16:
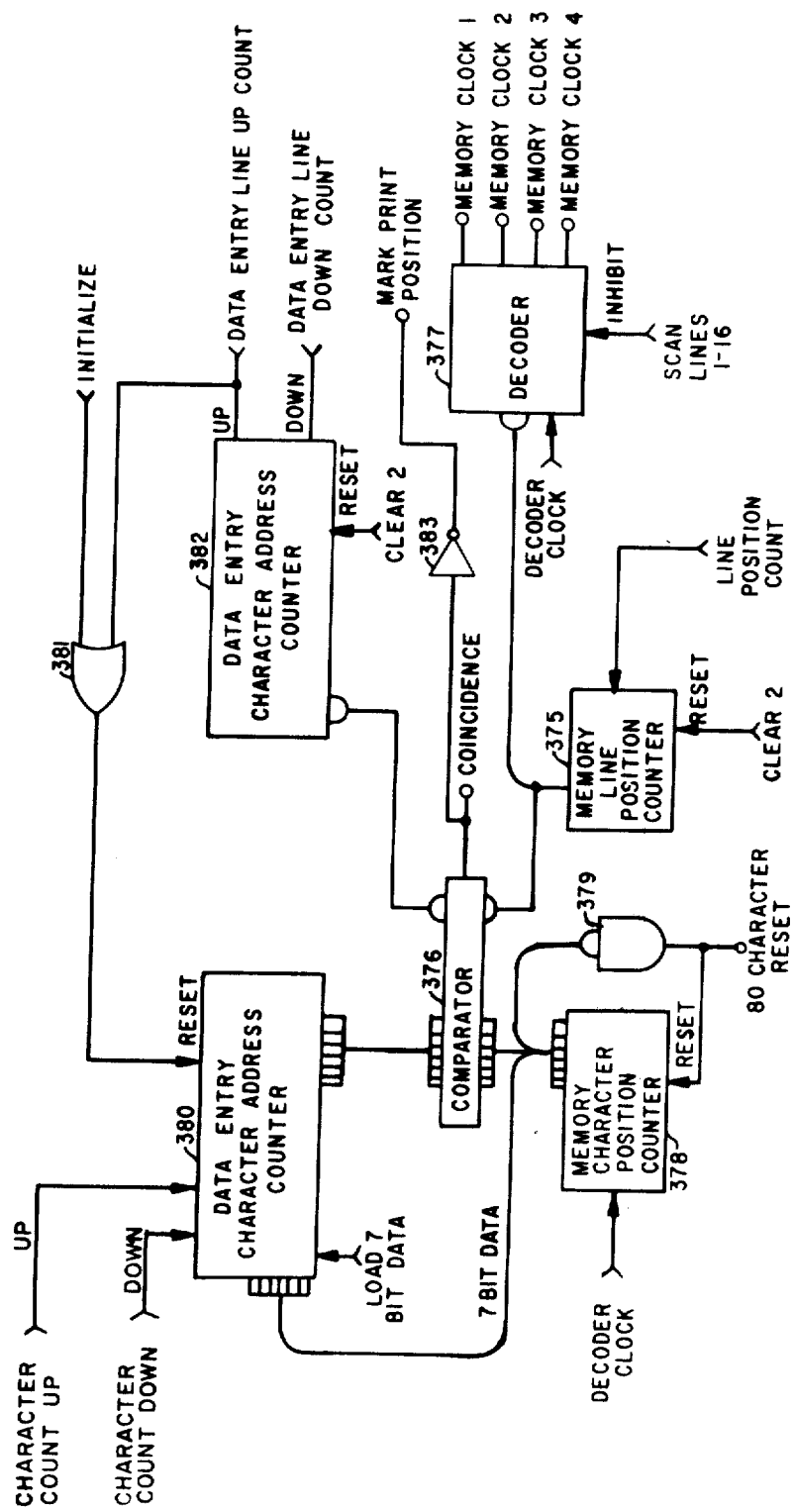
Figure 18:
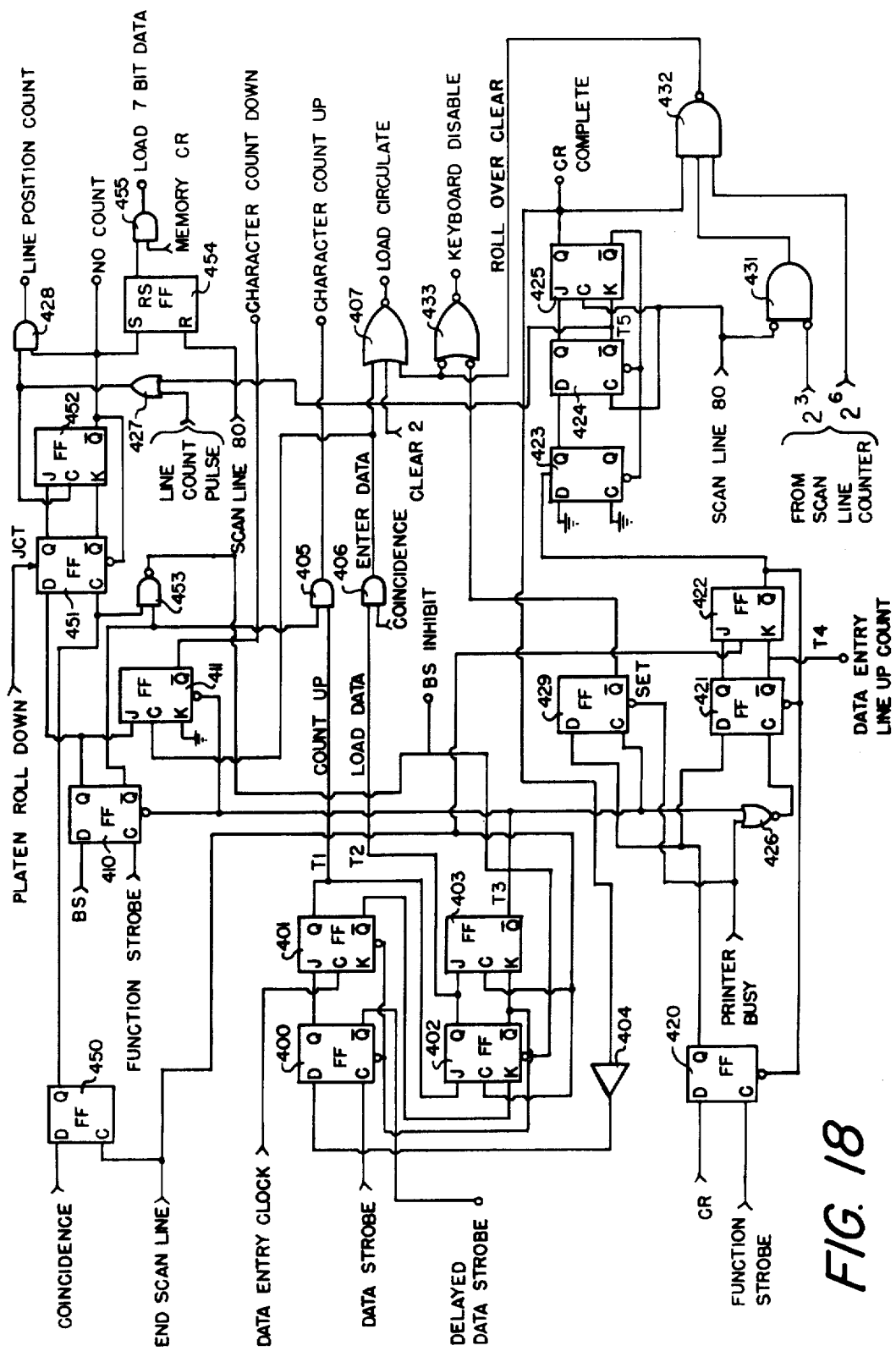
Figure 19:
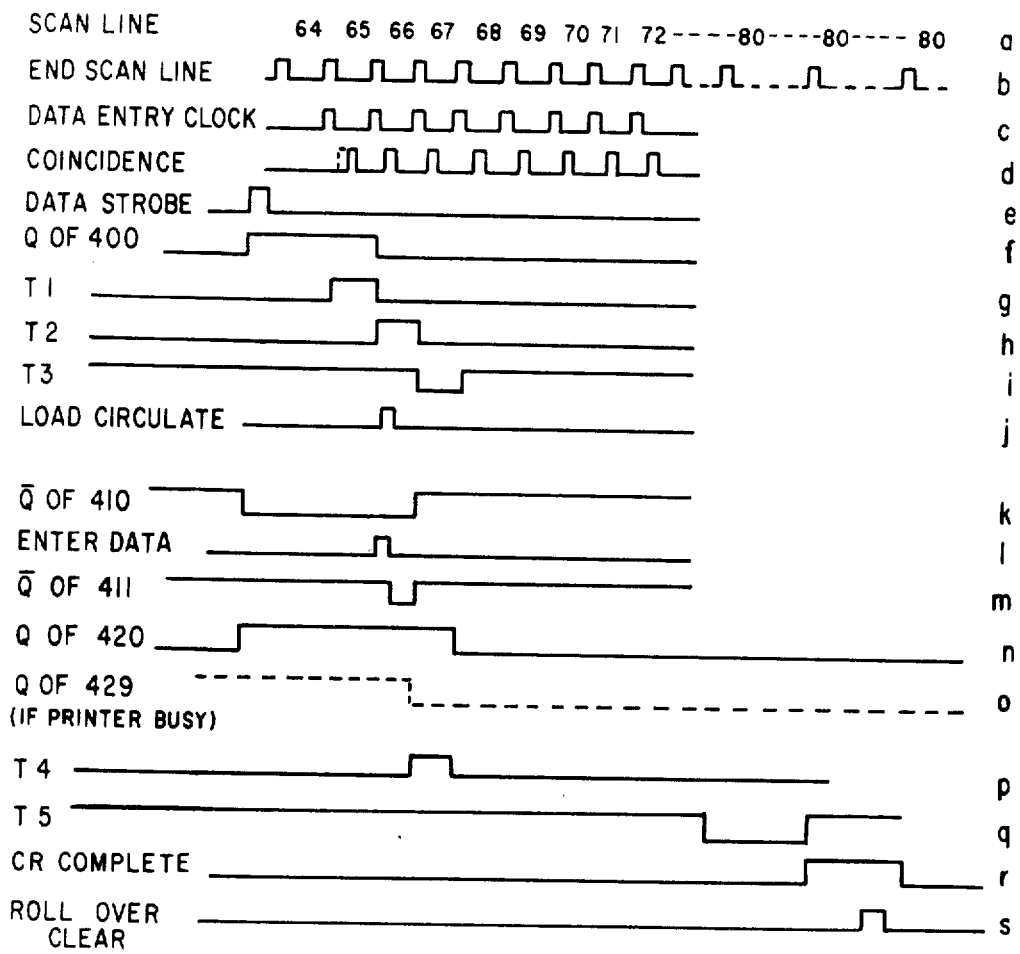
Figure 20:
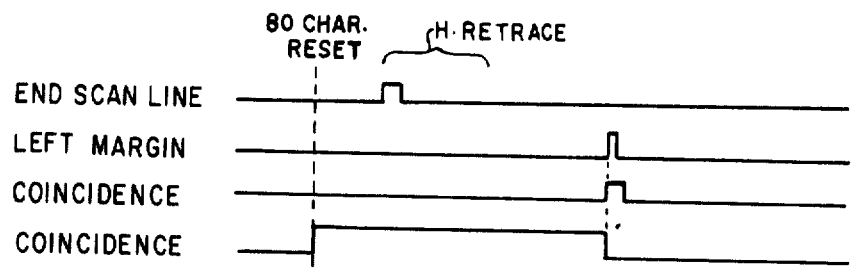
Figure 21:
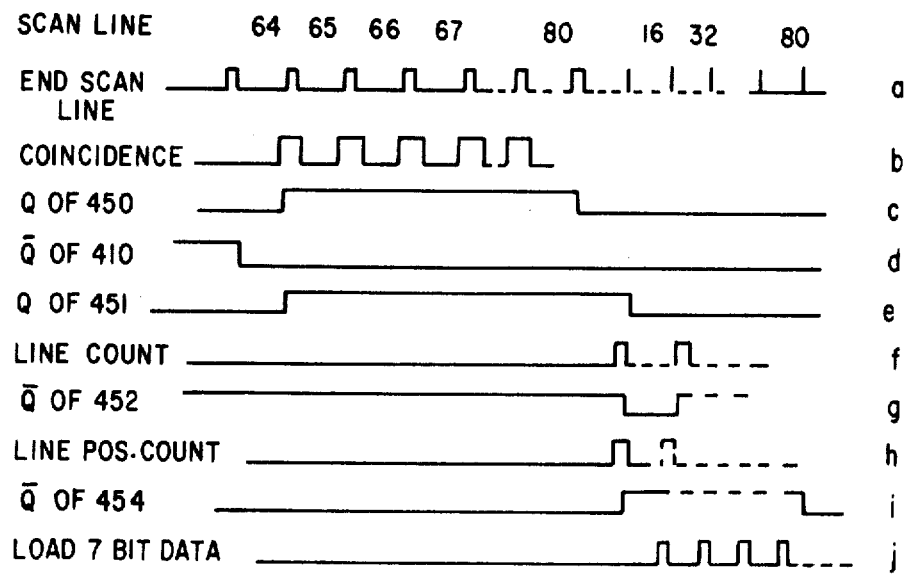
Figure 22:
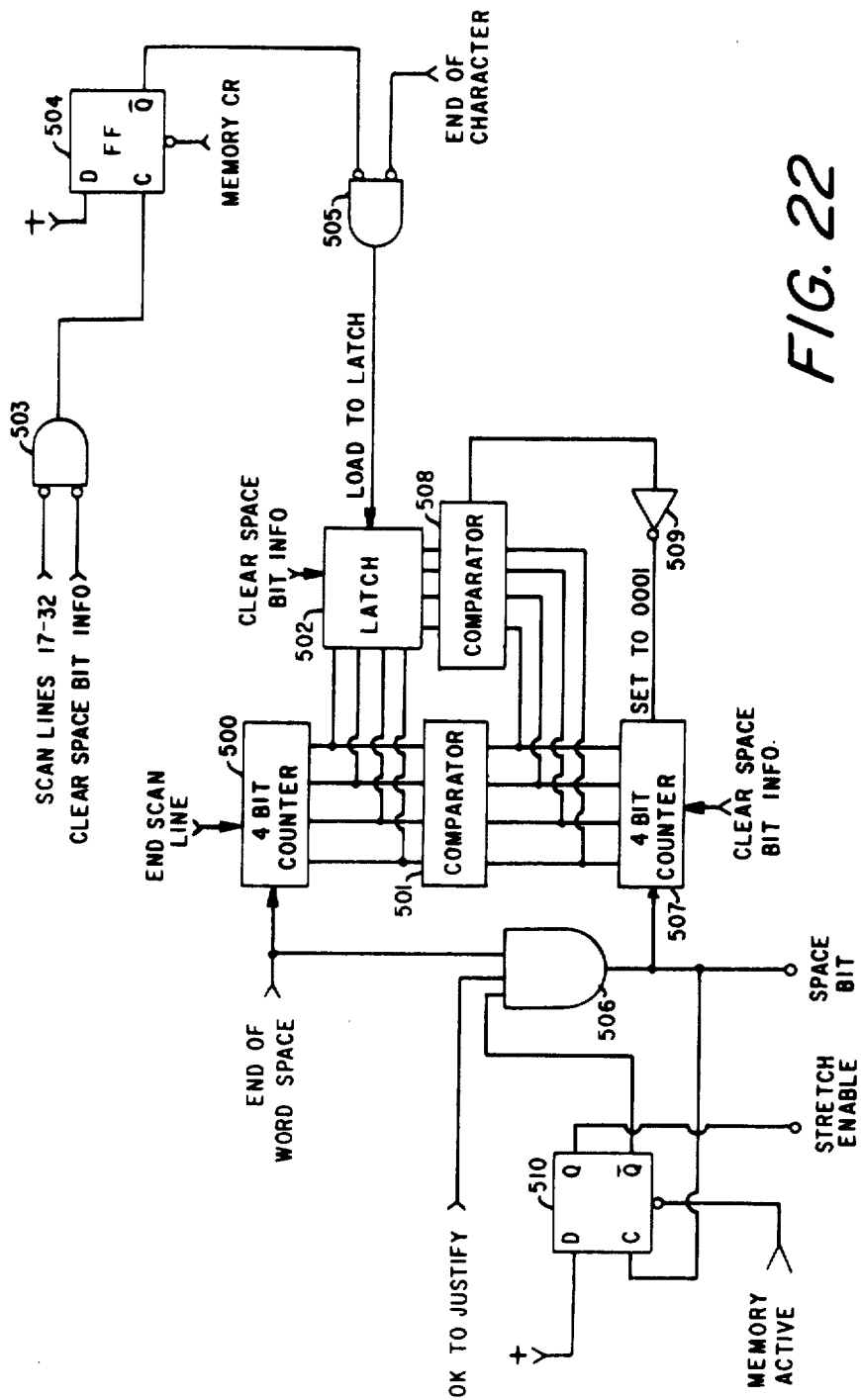
Figure 23:
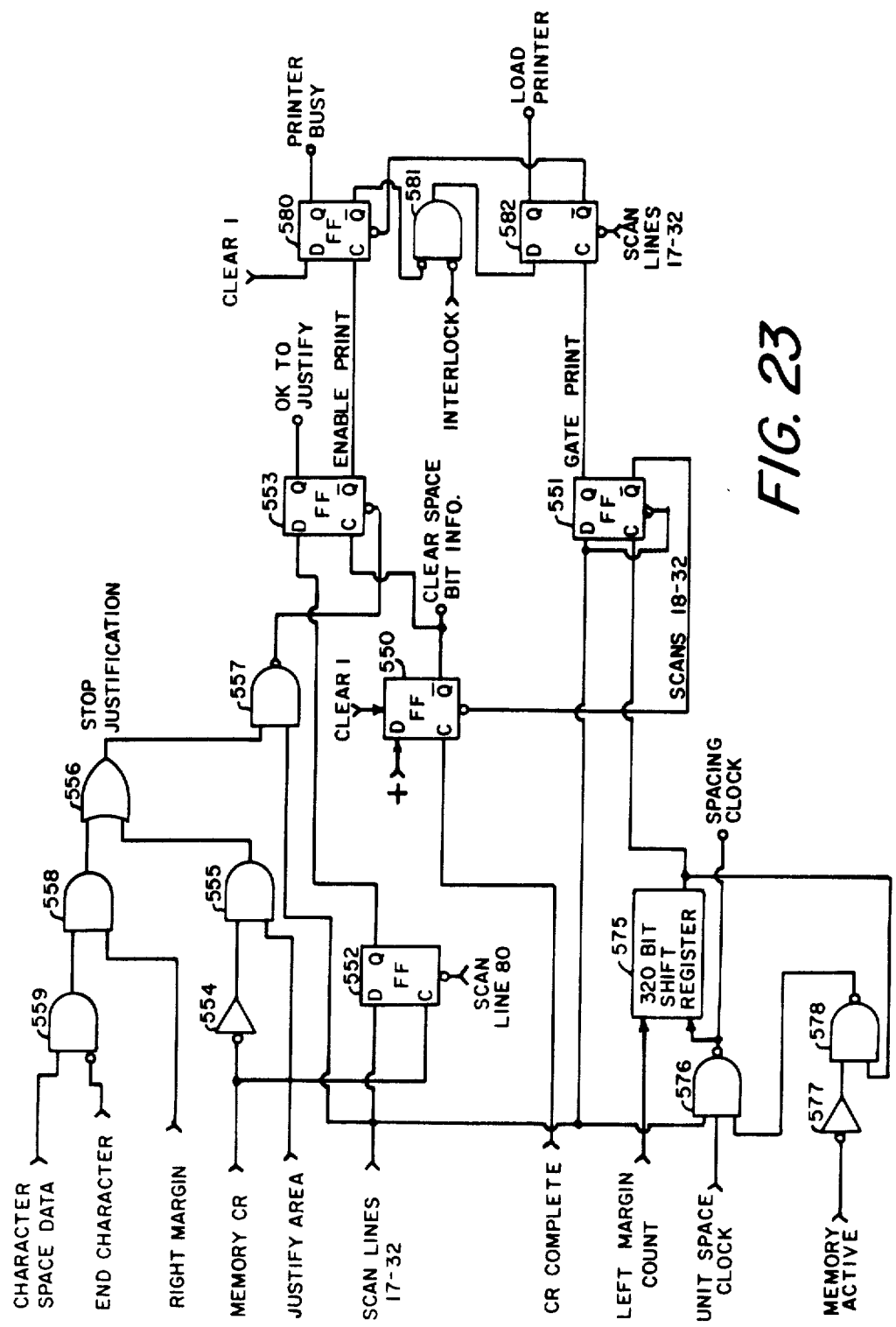
Figure 26:
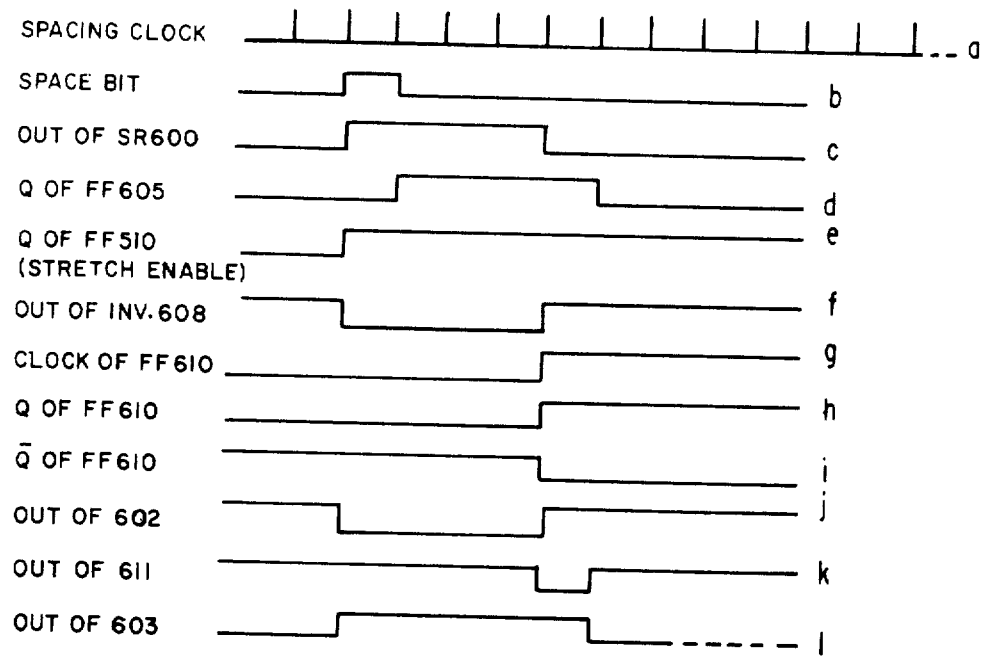
Figure 24:
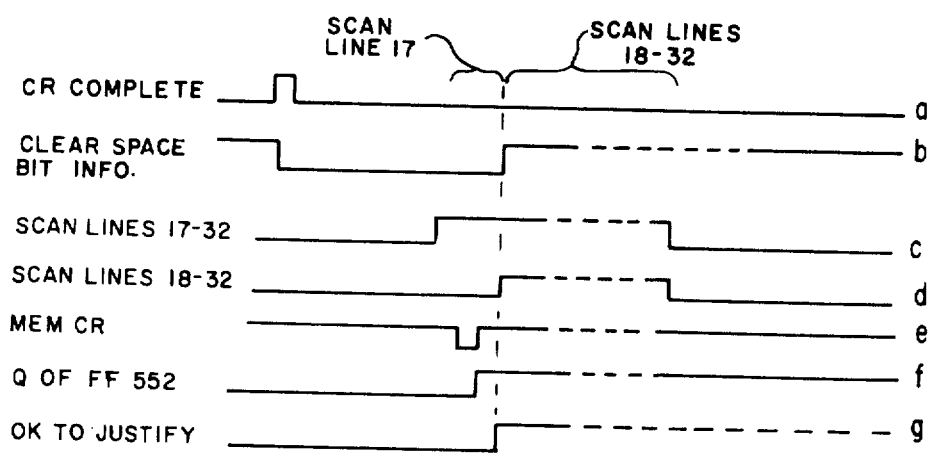
Figure 25:
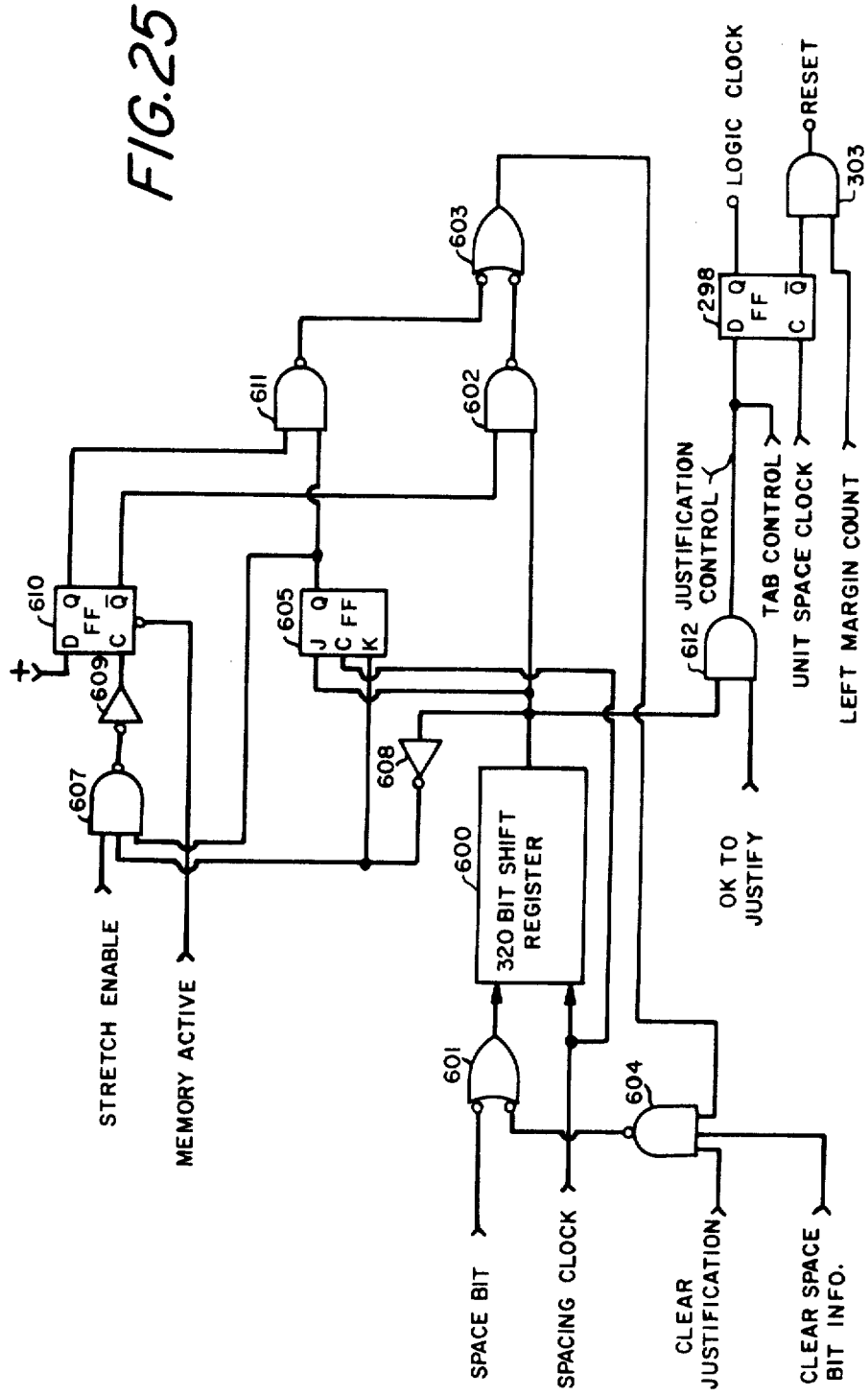
Figure 27:
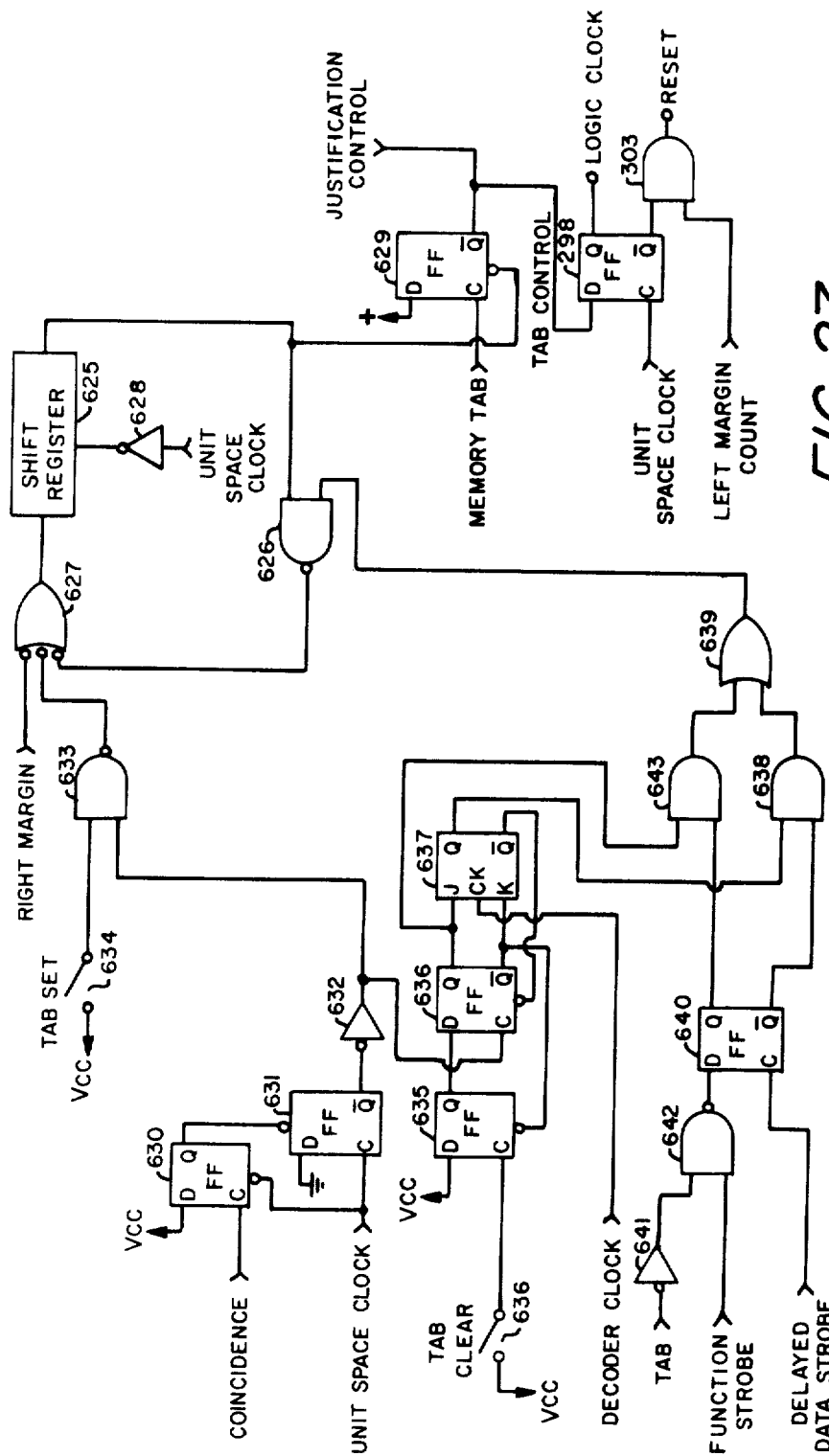
Figure 28:
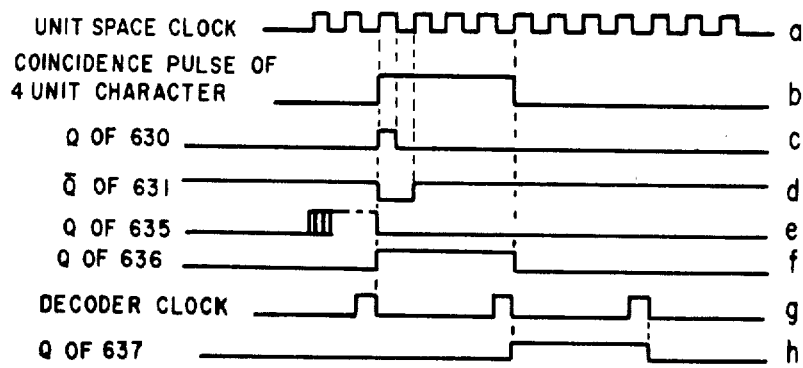
Figure 29:
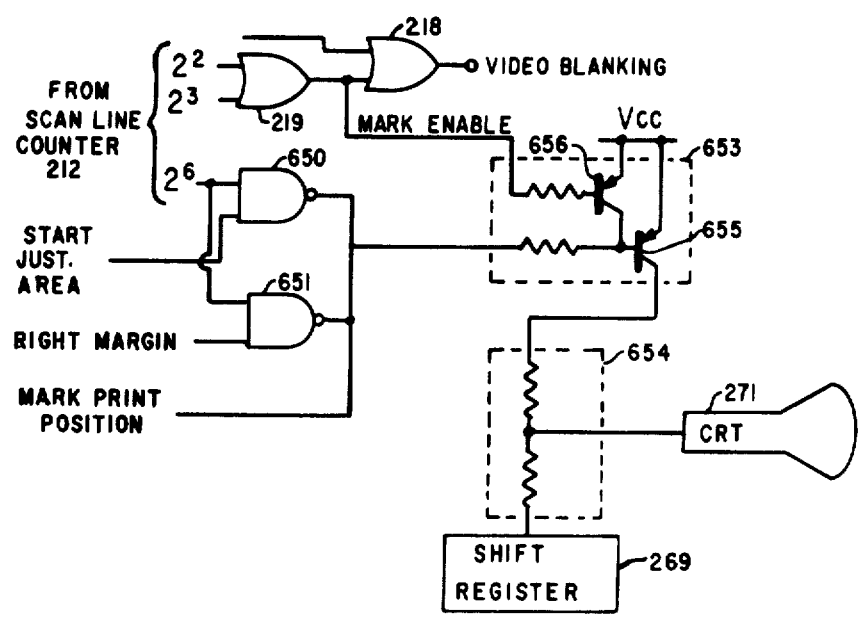
Figure 30:
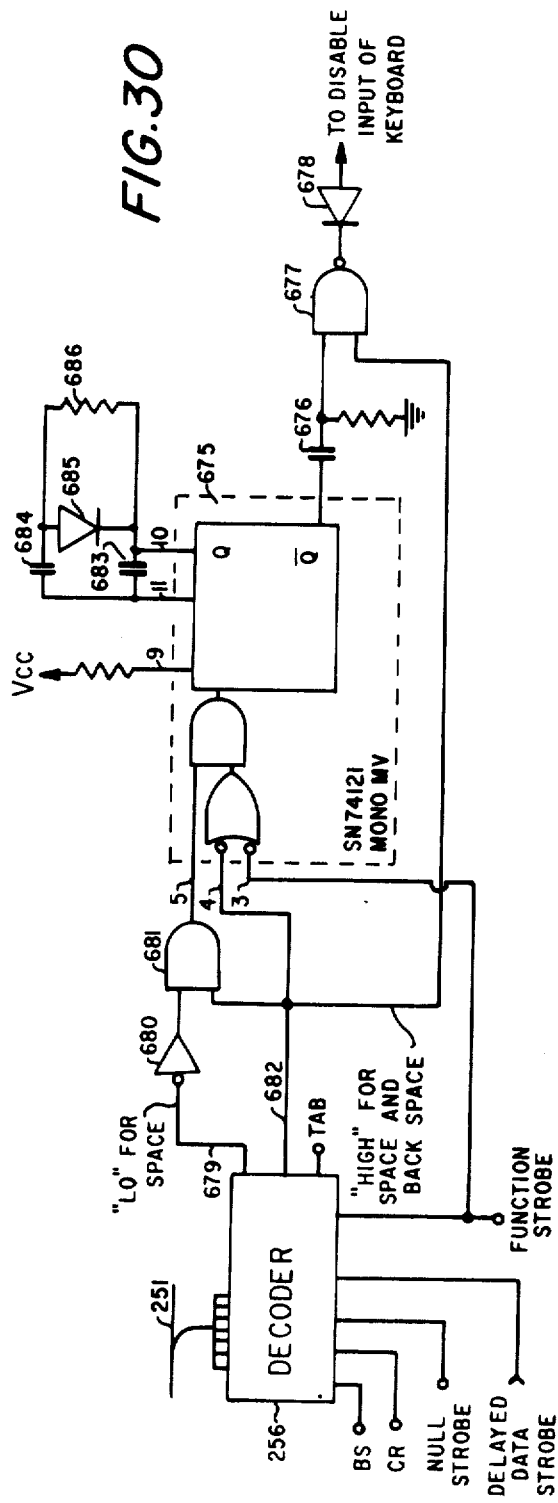
Figure 31:
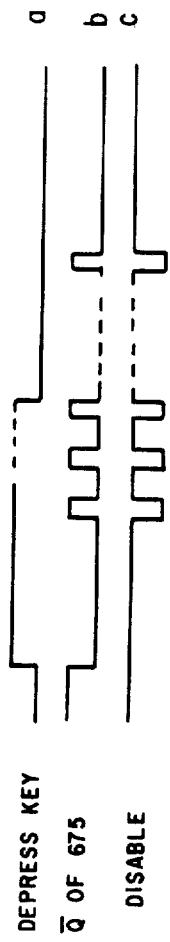
Figure 32:
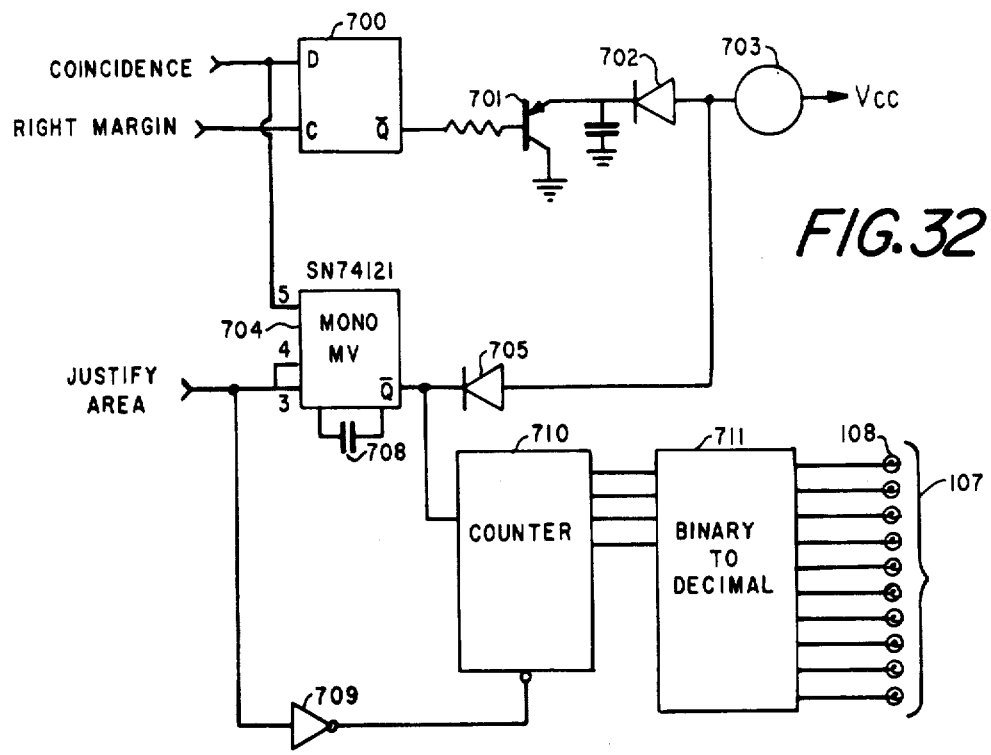
Figure 33:
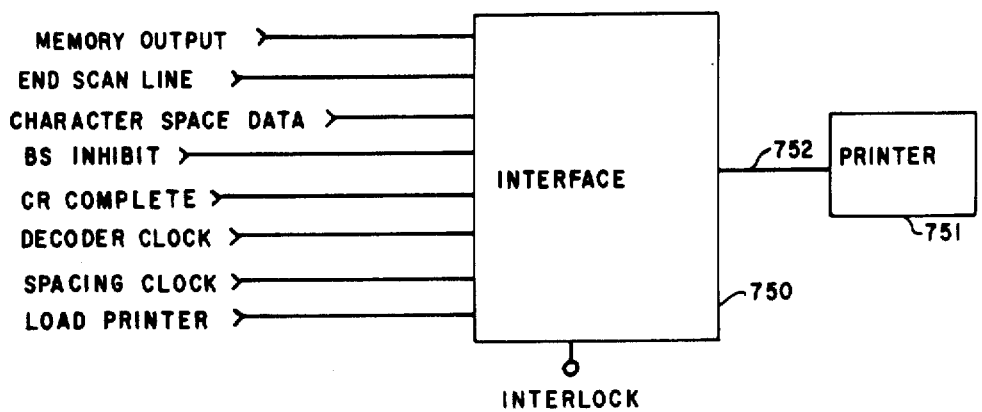

FIGS. 6a, 6b, 6c, 6d, 6e, and 6f illustrate justification, flush right and centering of words on the display of the apparatus of FIG. 1;

FIG. 7 illustrates the format of letters employed in the display of FIG. 1;

FIG. 8 is a simplified block diagram of a typographical apparatus in accordance with the invention;

FIG. 9 is a block diagram of a circuit for producing control signals for the typographical apparatus in accordance with the invention;

FIG. 10 is a block diagram of memory and display circuits for a typographical apparatus in accordance with the invention;

FIG. 11 is a block diagram of a Character Clock generator for the apparatus of the invention;

FIG. 12 is a truth table showing the derivation of the end of character and end of word space of FIG. 11;

FIG. 13 is a block diagram of a circuit for producing Decoder Clock signals for the apparatus of the invention;

FIG. 14 is a block diagram of an initializing circuit for the apparatus of the invention;

FIG. 15 illustrates various signals in the initialize circuit of FIG. 14;

FIG. 16 is a block diagram of illustrating circuits employed for storing and updating position information for the apparatus in accordance with the invention;

FIGS. 17a, 17b, 17c, and 17d are a table illustrating relationships between the counts in the counters and the display lines of the circuit of FIG. 16;

FIG. 18 is a block diagram illustrating the sequence control circuits of an apparatus in accordance with the invention;

FIG. 19 illustrates a number of signals, for explaining the operation of the circuit of FIG. 18;

FIG. 20 illustrates further signals for explaining the operation of the system of FIG. 18;

FIG. 21 illustrates still further signals for explaining the circuit of FIG. 18;

FIG. 22 is a block diagram illustrating a portion of a justification circuit for the system of the invention;

FIG. 23 is a block diagram illustrating a circuit for producing control signals for the justification system of the invention;

FIG. 24 illustrates various signals in the circuit of FIG. 23;

FIG. 25 is a block diagram of a further portion of a justification system of the apparatus of the invention;

FIG. 26 illustrates various signals for explaining the circuit of FIG. 25;

FIG. 27 is a block diagram illustrating Tab circuits for an apparatus in accordance with the invention;

FIG. 28 illustrates various signals of the circuit of FIG. 27;

FIG. 29 is a block diagram of circuits for producing video markets for the apparatus of the invention;

FIG. 30 is a block diagram of a circuit for providing repetitive space and backspace operation of the apparatus in accordance with the invention;

FIG. 31 illustrates various signals for explaining the operation of the circuits of FIG. 30;

FIG. 32 is a block diagram illustrating a circuit for producing audio alert signals for the apparatus of the invention; and FIG. 33 is a block diagram illustrating the interconnection of the system of the invention with a printer.

Referring now to the drawings, and more in particular to FIG. 1, therein is illustrated one embodiment of a typographic apparatus in accordance with the invention. The typographic apparatus is provided with a keyboard 100 which corresponds to conventional typewriter keyboards, with a few exceptions that will be discussed in greater detail in the following paragraphs.

Controls 101 and 102 are provided for the control of the left and right margins respectively of the typing region. A display panel 103 is provided in a position to be visible to the operator of the typewriter. A printing assembly 104 may be provided on the apparatus, including, for example, a rotatable platen 105. A connector 106 may be provided enabling the apparatus to be interconnected with other equipment, for example, remote printing devices. In addition, an indicating assembly 107 may be provided, within the peripheral view of an operator of the apparatus, and having a series of indicating lights 108 for indicating to the operator when a typing line has proceeded into a justification region. For example, in one line of the indication on the display 103 and in the final typed copy appearing in the printing apparatus 105. It will be apparent, of course, that the apparatus shown in FIG. 1 may be considerably modified. Thus, the printing apparatus may be omitted from the apparatus, in which case only a remote printer would be employed.

Figure 2:
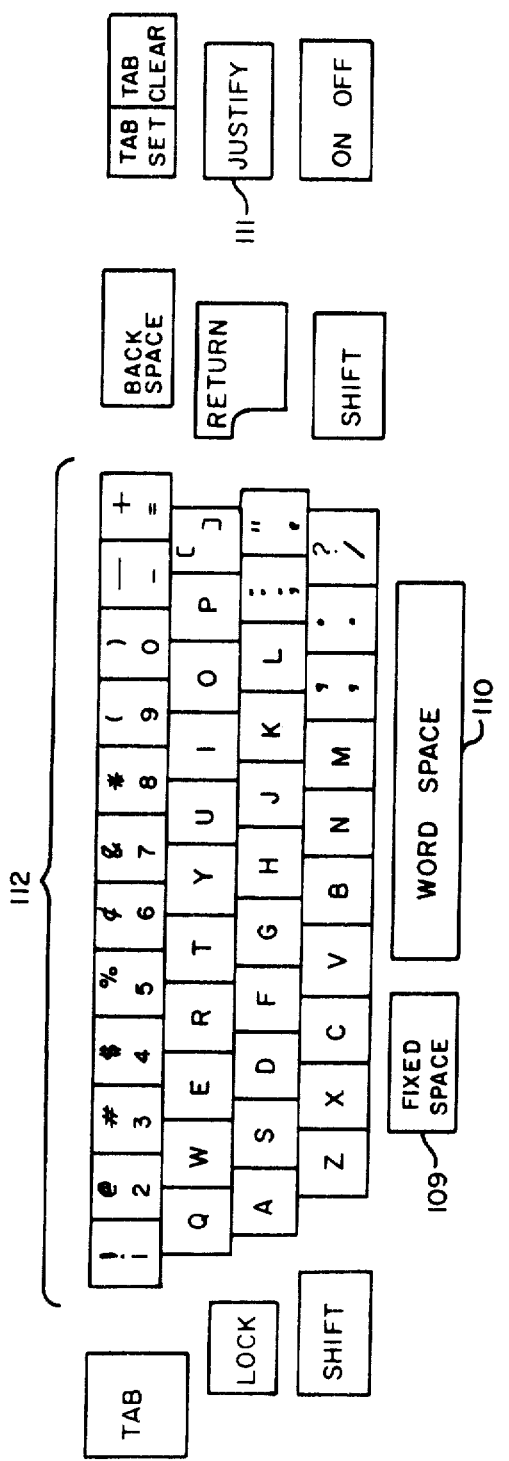
FIG. 2 is an illustration of the keyboard of the apparatus of FIG. 1.

FIG. 2 illustrates one example of a keyboard which may be employed in the apparatus of FIG. 1. It is apparent that the majority of the keys and controls on this board appear on standard conventional keyboards. In one exception, a "fixed space" bar 109 is provided, in addition to the conventional space bar 110. Insofar as the typewriter is employed in a non-justifying mode, this fixed space bar 109 functions in an identical manner to the conventional word space bar 110. It will be apparent in the following paragraphs, however, that particularly useful functions may be effected with the apparatus by the use of the fixed space bar 109 in a justification mode.

In addition, the keyboard is provided with a justify control 111, which permits the operator to enable or disable justification. For example, during tabulation, it may be desired to operate the system in a conventional manner. The character keys 112 represent characters to be typed or printed, in a conventional manner, and the remainder of the keys of the keyboard also serve their conventional functions. It is thus apparent that, in view of the minimal differences between the keyboard illustrated in FIG. 2 and conventional keyboards, little instruction is required for a typist trained to operate a conventional typewriter to be able to operate the typewriter in accordance with the invention.

FIG. 3 illustrates one example of the display which may be provided on a typewriter apparatus in accordance with the invention. This display exhibits four lines a, b, c and d of characters, and in the following disclosure it will be understood that the term "line" refers to a preferably horizonal line of characters or the locus of characters. The lines extend in the region between a left margin e and a right margin f, which may be varied in position. A further line g, to the left of the right-hand margin f, defines with the right-hand margin f, a justification area h.

The lower line d represents a line in which data may be currently entered, for example, by use of the keyboard illustrated in FIGS. 1 and 2.

As the entering of information into the line d (FIG. 3) proceeds, the print point j will advance rightwardly according to the widths of the text characters and spaces. The term "print point" is common in the typewriter and the printing industry and it means generally the same thing here. The "print point" is the place where the next character may be written, or the next space may occur, on the display, and it also indicates the next sequence location (or window) in the memory where the next character, space or control function may be encoded. Specifically herein, the term "print point" corresponds to the point at which the next operational instruction by the keyboard will occur. Of course, if the next information from the keyboard is a control function, such as a case-shift for example, the control function will be loaded appropriately next in the memory, but the print point will not move. However, if the information is for characters or spaces, the information is entered into the memory and the print point in the display moves appropriately for the entered characters and spaces. A visible indication of the print point j may be provided. Thus, as illustrated in FIG. 3, the last letter "s" has been displayed, and if the presentation in lines d is to be the same as in the presentation of the lines thereabove, the print point identifies the area in the line d at which the next entry will be provided. If, during the entering of data into a line, the print point advances beyond the line g, into the justification area h, the equipment in accordance with the invention will be able to justify the line to the right margin. In order for such justification to occur, the characters in the line may extend into the justification area, although alternatively the print point may be advanced into the area by the use of a space bar, without the necessity of characters themselves occurring in the justification area.

The line 3 illustrated in FIG. 3 represents the line that has been previously entered in line d, and moved upwardly to the line c by the operation of the carriage return. The line b displays the information that had previously been in line c, the shift of this data into line b being simultaneously effected in response to a carriage return instructions, with the upward shift of data from line d. Similarly, the top line a represents the upward shift of data that had previously been presented in line b. It will be particularly noted that the data in line a is justified, i.e., it extends completely between the left and right margins.

It will be obvious, of course, that the number of lines displayed in accordance with the invention may be varied so that, at the minimum, only a single justified or non-justified line, for example, corresponding to the line d or line a may be displayed. The entire display, which in FIG. 3 represents four lines is hereinafter referred to as a "scan", since according to the preferred embodiments of the invention the display will be effected by scanning techniques. In the display shown in FIG. 3, the data thus is normally moved upwardly, from line to line, upon the operation of a carriage return, and upon the shifting of information from line b to line a, the data that had previously been in line a is erased in the apparatus.

In a further feature in accordance with the invention, the display of the individual characters is "proportional", i.e., the characters are displayed in widths that are multiples of a given unit space width. For example, in FIG. 3, the letters "i" may be considered to be displayed in two unit spaces, the letters "s", "e" and "o" are shown displayed in three unit spaces, and the letter "N" is shown displayed in four unit spaces. As will be explained in greater detail in the following paragraphs, the space between characters may be controlled by the design of the individual characters. The space between words may be two unit spaces extending between the formats of a preceding and following characters, this word space resulting from the depression of a space bar.

In the justified line a illustrated in FIG. 3, it is noted that the proportional spacing of the letters in given words has been retained, but that the width of the word spaces has been increased in order to enable the line to extend completely between the left and right margins.

FIG. 4 illustrates the backspace technique employed in the equipment in accordance with the invention. If, for example, the backspace key of the equipment were depressed when the display illustrated in FIG. 3 was presented, the letter "s" would be deleted, and the print point j thus moved backward as illustrated in the top line of FIG. 4. Further depressing of the backspace key results in the further deletion of characters and the leftward movement of the print point, as illustrated in the remaining lines of FIG. 4 in order. When the print point follows a word space, of course, the depression of the backspace key merely moves the print point to the left. The bottom line of FIG. 4 thus shows the lower line of the display with a single character at the left margin, and the depression of the backspace key in this situation, of course, results in the erasing of the character and the movement of the print point to the beginning of the line. If the backspace key is depressed at the time the print point is at the beginning of the line d, hereinafter referred to as the data entry line, all of the lines of the display will shift downwardly by one line, as illustrated in FIG. 5, with the print point j o f the line which now appears in the data entry line d being moved to the end of this line. This latter operation during backspacing will be hereinafter referred to as a "roll down". FIGS. 6a, 6b, 6c, 6d, 6e, and 6f illustrate the functions of the fixed space key 109 on the keyboard of the typewriter in accordance with the invention. The fixed space key serves to advance the print point the same distance as the word space bar 110, but the equipment in accordance with the invention treats a signal corresponding to the fixed space key, in a justification operation, as a character that is not printed, rather than as a word space. In a justification operation, word spaces are expanded in width until a character appears at the right margin. Thus, FIG. 6A illustrates a line typed in the normal fashion, employing a word space k between words, with the print point being extended into the justification region h, for example, by operation of the word space bar. If the line of FIG. 6A is justified, the word spaces are expanded, whereby, as illustrated in FIG. 6B, if only one word space is provided one word will appear at the beginning of the line and the other word will appear at the end of the line.

If now two words are typed, as in FIG. 6C, with a word space at the beginning of the line and a fixed space 1 between the words, and the print point is advanced into the justification region h, upon justification the entire group of two words and the intermediate fixed space 1 will be advanced to the right-hand margin without expansion of the fixed space 1, to provide a "flush right" operation, as illustrated in FIG. 6D. This operation is useful, for example, in enabling an operator to move a date and address at the beginning of a letter to the right margin.

The fixed space may be also employed to center a line, for example, to center a title. Thus, as illustrated in FIG. 6E, if a word space k is provided at the beginning of a line, a fixed space 1 between each word, and a word space k and fixed space 1 at the end of the line, with the print point being advanced into the justification region, the line will be expanded as illustrated in FIG. 6F, with the words and fixed spaces therebetween not being expanded. In the arrangement in accordance with the invention, the expansion occurs only in the word space areas, and not in the fixed space areas, and the last fixed space 1 will in effect be treated as a character, and positioned at the end of the line, although this fixed space "character" does not appear in the display.

In conventional display devices, such as cathode ray tubes, for the display of alpha-numeric characters, the display is scanned sequentially, for example, with the beam scanning from left to right of the display screen to form scan lines and the scan lines proceeding sequentially from the top to the bottom of the display screen, with the beam being intensity-modulated in accordance with the information to be displayed. In systems of this type it is, of course, necessary to synchronize the scanning and the modulation of the beam, so that an intelligent display may be presented.

In order to establish nomenclature which will be employed in the following description, FIG. 7 illustrates a portion of a preferred display in accordance with the invention. FIG. 7 illustrates two lines m and n of the display. Each line is the result of sixteen horizontal "scan lines" of the beam, with the beam being intensity-modulated in the scan lines in accordance with a determined program, to produce visible dots. The top 8 scan lines o of each line are employed for displaying upper case letters, with the lower of these scan lines o being employed for displaying the portions of lower case letters above the line. The ninth through twelfth scan lines p of each line are employed for displaying the portions of lower case letters of other characters below the line, as well as for displaying, for example, indications of the print point, justification area and margins. The remaining four scan lines q of each line are left blank, to provide a space between the lines.

In the embodiment of the display illustrated in FIG. 7, a dot frequency has been selected so that two dots correspond to a unit space r. In accordance with this format, the basic format for a four unit space letter, such as the letter "N" is eight dot positions wide and twelve dot positions tall. The lower four scan lines are not employed for upper case letters, and the last dot position in each scan line is also left blank, as a part of the format, in order to provide a space between characters. Similarly, 3 unit space characters and 2 unit space characters are six dot positions and four dot positions wide, respectively, with the last dot position in each character matrix being left blank for letter spacing. Consequently, as illustrated in FIG. 7, dots only appear in the first seven dot positions of the letter "N" and the letter "w", while dots only appear in the first five dot positions of the three unit space letters, such as the letter "o". It is, of course, apparent that all other formats may be employed, and that the number of dot positions employed for spacing between letters may be increased, if desired, in order to separate the letters in a word more clearly.

As an example, in the first scan line of the line m, dots appear at the first and seventh dot positions respectively to form the upper portion of the letter "N", with the eighth dot position t, corresponding to the space between letters, being blank. The dots are displayed by determined dot positions in succeeding scan lines, as illustrated, in order to form the desired characters.

It will be apparent, of course, that other parameters may be employed in the scanning and dot frequencies, such as the provision of a greater or lesser number of scan lines for each character line, and an increase or decrease in the dot frequency with respect to the unit space frequency. It will be further apparent that the same formation of characters may be employed in other dot matrix type of displays.

SIMPLIFIED CIRCUIT DESCRIPTION

FIG. 8 is a block diagram illustrating in simplified form, the apparatus in accordance with the invention. In this figure, a keyboard 150 of conventional nature provides coded parallel data output on lines 151, the data corresponding to keys of the keyboard that have been depressed. This data is applied in parallel to each memory of a memory system 152, and the data is also applied to a decoder 170.

Each of the separate memories of the memory system 152 may comprise for example, a circulating shift register. The memory system is controlled by a sequence control system 153 and a second decoder 154. The sequence control 153 controls the memory system to either be in a normal recirculating mode, in which data cannot be entered into the memories, and a data entry mode in which the memory system can accept data from the keyboard for storage. The decoder 154 provides signals which sequentially activate the separate memories of the memory system 152, whereby during each activation period of a memory a determined number of strobe pulses are applied to the activated memory to effect the complete recirculation of the activated memory. The outputs of the memories are applied to a multiplexer 155, whereby only a memory that is being strobed applies an output to the multiplexer. As an example, non-activated memories are stopped with a logic "0" in their last stage, so that no data is applied from these memories to the multiplexer. The output of the multiplexer is applied to a dot generator 156, which may for example, be a read only memory, to provide a video signal for application to a display device such as cathode ray tube 157.

Conventional scanning systems for the display device, such as horizontal scanning generator 158 and vertical scanning generator 159 are provided. It will be apparent, of course, that the scanning of the display device is synchronized with the control signals in the system.

Each of the memories of the memory system 152 can store a discrete amount of data, for example the data for the display of a single line on the display device. The data stored in each memory is not unique to a given line of the display, however, since the decoder 154 controls the activation of the memories to select the correspondence between the displayed lines and the data stored in each memory. The decoder 154 thus controls the upward and/or downward movement of the data lines on the display screen.

The activation of the memories must be cycled with the presentation of the lines on the display device, and for this purpose a memory line position counter 160 is provided, controlled by a line count pulse synchronized with the scan lines of the display device, for controlling the decoder 154 to cycle the appropriate memory of the memory system 152 in the desired sequence.

If it is desired to change the relative position of the data on the screen, for example, if a carriage return signal is received from the keyboard 150, a signal responsive to the depression of the carriage return key of the keyboard is applied to the counter 160, to advance the count therein, thereby changing the order of activation of the memories of the memory system 152, relative to vertical synchronization in the display, by one line.

The cyclic activation of the memories may also be changed in the opposite direction, as will be discussed in greater detail in the following description.

As above discussed, in one embodiment of the invention, data is only entered in the lower displayed line. It is further evident that the entry of data must occur at the active, i.e., printing, position in the lower line, i.e., the position following the position at which data was last entered into the corresponding memory. It is thus necessary to provide means for storing the location of the active position and for storing the address of the data entry line. The active position is stored in a data entry character accross counter 161, and the address of the data entry line is stored in a counter 162. These counters are selectively stepped upwardly or downwardly in response to a strobe signal from the keyboard 150, corresponding to the depression of any key, as well as to specific function signals at the output of the decoder 170 corresponding, for example, to backspace and carriage return signals from the keyboard.

It is further necessary to ascertain continuously the active position of the activated memory, so that, for example, the entry of data can be synchronized with the stepping of the memory. For this purpose, a memory position character counter 163 is provided, stepped at the rate of the stepping of the memories. While this stepping of the memories may be effected at a fixed rate, whereby all characters will have the same widths, it is preferred in accordance with the invention to provide means for displaying the different characters with different determined widths. For this purpose, the output of the multiplexer 155 which corresponds to the character, or one scan line of the character which will be next displayed, is applied to a character clock generator circuit 164. This circuit includes a read only memory responsive to the specific character of space signals for generating a character clock pulse, spaced from a previous character clock pulse by a time corresponding to the desired width display of the character. These character clock pulses are applied to the counter 163 for stepping this counter in accordance with the display, and the character clock signals are also applied to the decoder 154 for stepping the memories in response to the character clock signals. The timing of the clock signals for stepping the memories is therefore dependent upon the desired display widths of the characters corresponding to data stored in the stages of the memories.

Since it is necessary that new data be entered only in the data entry line at the active point, the output of data entry character address counter 161 is compared with the output of memory position character counter 163, and the output of data entry line address counter 162 is compared with the output of memory line position counter 160 in a comparator 165. When a comparison is detected in the comparator 165, a coincidence pulse from the comparator is applied to the sequence control circuit 153. In response thereto the sequence control circuit applies a signal to the control input of the memory system 152 to enable the entry of data at the active position in the memory corresponding to the data entry line, i.e., in the active memory.

In one embodiment of the invention, the display may be rolled down, whereby, for example, the data displayed in the third line of the display will move downwardly to the fourth or data entry line. Upon the occurrence of this shift, the active position defined by the data entry character address counter 161 will no longer correspond to the effective active position of the data now displayed in the data entry line. It is thus necessary to update the counter 161 to the count of the correct active position. The data which, in this case, is now in the data entry line was terminated by a carriage return signal and hence a carriage return signal is stored in the position in the corresponding memory at the effective active position. When the data relating to this carriage return signal is received at the output of the multiplexer 155, it is decoded in a decoder 166 and applied to the sequence control circuit 153 for generating a load signal applied to the counter 161, enabling the entry therein of the instantaneous count of the memory position character counter 163 which, at that instant has a count corresponding to the position of the carriage return signal. The count in the data entry character address counter is thereby updated to the count corresponding to the desired printing position in the data now in the data entry line.

While justification may be effected by any number of means, in accordance with one embodiment of the invention a justification control circuit 167 is provided for expanding the widths of word spaces by delaying the character clock pulses corresponding to word spaces. For this purpose, the occurrence of word spaces is detected in the character clock generator 164 and applied to control the justification control circuit 167, which also includes means for determining the required increase of width of word spaces to effect justification. The justification control circuit 167 thereby delays the production of character clocks from the generator 164, in order that the desired spacing is produced between words of the justified line of the display.

A marker generator 171 may also be applied, connected to receive timing signals from the sequence control circuit 153, to produce video signals for marking the active position, the position of the justification area, and, if desired, the margins.

Further specific features of the apparatus in accordance with the invention, such as tab control and printing, will be discussed in specific sections relating to these features.

SYNCHRONIZATION SIGNALS

Referring now to FIG. 9, therein is illustrated a block diagram of a circuit for generating the continuously operative synchronization and control signals for a system in accordance with the invention. In this circuit, a master high frequency oscillator 200 having a frequency of, for example, 4 megaHerz, provides a Dot Clock signal for timing the appearance of dots in the display. The four mHz oscillations are also applied to a flip flop 201, for generating a Unit Space Clock signal, thereby defining a unit space width on the display. In this example, the Unit Space Clock has a frequency half that of the Dot Clock, although it will be apparent that other integral relationships may be provided between the Dot Clock and the Unit Space Clock.

The Unit Space Clock is applied to a three-decade counter 202 providing a parallel output. This output is applied to a count detector 203 which detects a count corresponding to the decimal number 397, the output of the count detector 203 being applied to reset the decade counter 202. Thus, the three decade counter 202 will be reset each time its count is equivalent of decimal 397. The count detector 203 thus establishes a scan line length of 397 unit spaces (this length will, of course, also include the horizontal retrace time on the display). The count detector 203 may be comprised, for example, of a comparator having a second fixed BCD input corresponding to the desired count to be detected.

The output of the three-decade counter 202 is also applied to comparators 204, 205 and 206, which may be of conventional construction. Count sources 207, 208 and 209 provide second inputs to the comparators 204, 205 and 206 respectively. These count sources may be comprised, for example, of manually controlled switches, to enable setting of determined counts therein. The count source 207 is provided for setting the left margin, the count source 208 is provided for setting the count of the printing point at the start of the justification area, and the count source 209 is provided for setting the count at the right margin. The count sources 207 and 209 may, for example, be controlled by the controls 101 and 102 of FIG. 1, readily available to the operator of the equipment for setting the left and right margins, while the count source 208 may be provided at a further location on the keyboard if desired, to set the length of the justification area, although during normal typing this adjustment will not ordinarily be employed. The output of the comparator 205 is applied to set a flip flop 210, the flip flop being reset by the output of the count detector 203, to provide a Justification Area signal which occurs between the start of the justification area and the end of the scan line.

The output of the count detector 203 is also applied to a pulse generator 211 for generating a synchronization pulse for the horizontal scanning of the display device.

The output of the count detector 203 is also applied to a scan line counter 212, which may be comprised of a binary counter providing a seven bit parallel output on lines 213 corresponding to the number of the scan line. The count output of the counter 212 is synchronized with the Unit Space Clock.

In the display illustrated in FIG. 3, four lines are displayed, each including twelve scan lines followed by four blank lines defining the space between lines. In order to provide time for one vertical sweep on the display, the timing circuits are connected to include time for five full lines, i.e., 80 scan lines. The first sixteen scan lines will thereby blanked out to allow for vertical retrace, with scan lines 17-32 corresponding to the upper displayed line a, scan lines 32-48 corresponding to the second displayed line b, scan lines 49-64 corresponding to the third displayed line c, and scan lines 65-80 corresponding to the last or data entry line d. At the end of scan line 80, a vertical retrace signal is produced.

Referring again to FIG. 9, in order to provide a blanking signal for the first 16 lines, i.e., the vertical retrace, three bits of the output of the counter 212 are applied to a NOR gate 214 by way of separate inverters 215, 216 and 217, the output of the gate 214 providing a signal during the occurrence of the scan lines 1-16 and being applied to an OR gate 218 for providing a video blanking signal. Two bits of the output of counter 212 are also applied to an AND gate 219, the output of the AND gate being applied to the OR gate 218 in order that the video blanking signal also occur in the last four scan lines of each group of 16 scan lines, i.e., thereby blanking the scan lines between character lines.

In the illustrated embodiment of the invention, it is necessary to detect the scan lines corresponding to the first displayed line separately, since justification occurs only in this line. Accordingly, one bit from the counter 212, and the outputs of the inventers 216 and 217 are applied to a NOR gate 220, whereby an output from this NOR gate occurs during the scan lines 17-32.

In addition, it is necessary to provide a signal indicating the scan lines of the fourth line, i.e., the data entry line, during which time data may be entered into the equipment from the keyboard. While it is only necessary to enable data entry during one of the scan lines of the fourth line, means are provided for indicating each of the scan lines 65-72 (i.e., eight scan lines), in order to avoid the additional components which would be necessary to select only a single scan line. For this purpose, two bits of the output of counter 212 and the output of the count detector 203 are applied to an AND gate 221, whereby the output of the AND gate 221 is a series of eight pulses, each pulse occurring at the end of one of the scan lines 64-71. This signal is referred to as the Data Entry Clock.

In order to permit proper orientation of the display with respect to stored data, it is necessary to provide a Line Count pulse, which occurs synchronized with the start of each display line (but not with the blanked line corresponding to scan lines 1-16). Thus, a Line Count pulse is provided at the beginnings of each of the scan lines 17, 33, 49 and 65. For this purpose, a four bit counter is provided comprising a JK flip flop 222 clocked by one bit of the output of counter 212, and having an inverted input to its J terminal from another bit of the counter 212, the K terminal being connected to ground reference. A second JK flip flop 223 connected to the output of the flip flop 222 is clocked by the Unit Space Clock, the $\overline{Q}$ output of the flip flop 222 and the Q output of the flip flop 223 being applied to a NAND gate 224 to provide the Line Count pulse. The flip flop 222 is reset by the $\overline{Q}$ output of flip flop 223. The eightieth scan line in each scan is detected by a NAND gate 225 connected to two bits of the output of counter 212, the output of this gate resetting the counter 212 on the eightieth scan line, synchronizing the generation of a pulse in generator 226 to provide a vertical display synchronization pulse, and to provide an output Scan Line 80 signal at the end of each full scan.

The output of the count detector 203 also forms an End Scan Line pulse at the end of each of the scan lines 1-80.

It will be recalled that the display of each character is in the form of dots which occur on the different scan lines. In the disclosed arrangement in accordance with the invention, the program for the dot matrix display of the characters in the different scan lines thereof is stored in a Read Only Memory, herein after referred to as an ROM, which conveniently may be a Programmable Read Only Memory, hereinafter referred to as a PROM, to enable development of character size and shape. In order to address the proper ROM for the generation of the necessary dots, it is necessary to provide ROM Enable signals indicating the scan line currently being scanned. For this purpose, a decoder 227 is connected to receive three bits from the scan line counter 212. The decoder 227 may be comprised, for example, of a BCD-decimal decoder, the outputs A-F of the decoder 227 constituting ROM Enable signals. A further ROM Enable signal G is obtained from a further bit output of the counter 212.

The outputs of the scan line counter 212 are indicated in FIG. 9 by powers of 2, this designation indicating the corresponding bit of the output. Thus $2^6$ indicates the most significant bit. A further output of the bits $2^3$ and $2^6$ is provided for a purpose that will be disclosed in greater detail in the following disclosure.

DATA INPUT, MEMORY AND DISPLAY

Referring now to FIG. 10, therein is illustrated a keyboard 250 of conventional nature, providing, as outputs, parallel coded outputs on output line 251 corresponding to a key depressed on the keyboard, and a data strobe signal on line 252 responsive to the depression of most of the keys on the keyboard. (Certain keys, such as TAB Set, TAB clear, Justify On-Off, etc., will not produce data strobe signals.). As an example, the keyboard may provide a seven bit ASCII code (American Standard Code for Information Interchange) on the lines 251, although it will be apparent that other codes may be employed. As an example, the depression of a key on the keyboard results in the application of data logic levels to determined output lines, in accordance with the key depressed, and the simultaneous production of a data strobe signal on the line 252. A keyboard disable line 253 is connected to the keyboard, for purposes that will be hereinafter described.

In order to enable control of the various circuits of the apparatus, it is necessary to identify certain function signals, i.e., signals corresponding to functions of operation as opposed to characters. For this purpose, decoder 254 is connected to the lines 251 to provide an output signal BS upon depression of the backspace key on a keyboard, a signal CR responsive to the depression of the carriage return key on the keyboard, an output signal NULL Strobe responsive to, for example, the depression of the On-Off button of the keyboard to "ON" and a signal Function Strobe, responsive to the depression of any of the keys of the keyboard which respond to a function as opposed to a character. A Delayed Data Strobe signal, generated in a manner that will be described in later paragraphs in response to the Data Strobe Signal, delays the generation of the NULL Strobe and Function Strobe signals. The decoder 254 may, for example, be comprised of a pair of BCD-decimal decoders, such as type SN7442, each connected to different lines 251, with a separate AND gate connected to the BCD decoders to select each desired function signal. The desired function signal may also be detected by using edge-triggered flip flops with their D and CK inputs connected to outputs of separate BCD decoders. The Delayed Data Strobe is applied to the BCD decoder connected to the CK input of the flip flop, to insure that the output of the decoder 254 is stable at the clocking time.

It should be noted that the Data Strobe signal is generated to indicate that all seven bits at the output of the keyboard are stable and valid, and this signal occurs with a delay with respect to the appearance of the seven bit coded signal. The Data Strobe signal is removed upon release of the key, but release of the key does not effect release of the seven bit coded signal until a further key has been depressed.

The Keyboard Disable function is necessary, for example, if the apparatus in accordance with the invention is employed in combination with a printer, in which case, print out of the line to be printed from the apparatus must be completed prior to the shifting of lines on the display. Thus, if more than one carriage return signal CR is received, during the printing operation, a Keyboard Disable signal will be generated. The generation of this signal will be discussed in the following disclosure.

The keyboard is provided with suitable power, as indicated, and may, for example, be of type Micro Switch (51SW12-1).

The seven parallel bits from the keyboard on lines 250 are applied to separate channels of seven channel 80 bit circulating shift registers 256, 257, 258 and 259, which serve as memories in the apparatus.

A Load Circulate Signal (Memory Control) is applied in common to each of the shift registers 256-259. In the absence of a Load Circulate signal, each of the shift registers is in the circulating mode, while the Load Circulate signal is active, the circulating shift registers are energized to accept and store data received thereby. Memory Clock signals 1-4 are separately applied to the shift registers 256-259 to effect the stepping of the shift registers. As will be explained in the following paragraphs, the Memory Clock signals are sequentially applied to the shift register, whereby, for example, a series of Memory Clock pulses is applied to the shift register 256 to shift the data stored therein, followed by the application of a series of Memory Clock pulses to the shift register 257 to effect the shifting of data stored therein, etc., whereby the shift registers are sequentially energized. It is to be noted that a shift register 256-259 cannot receive and store input data or circulate data unless it is being clocked.

As an example, each of the shift registers may be comprised of a pair of Quad recirculating shift registers of type 2532. It will be apparent, of course, that other memory devices serving the above functions may alternatively be employed.

The seven bit outputs of the channels of the shift registers 256-259 are applied in parallel to the input of a multiplexer 260. In the multiplexer, each input line is connected to an inverter 261, only four of which are illustrated in the figure for clarity of the drawing. The inverters 261 may be open collector inverters, such as type SN7405, with the collectors of al inverters corresponding to the channel being wired together (to serve an OR function) and connected to the input of a further inverter 262, only one of which is also shown for the sake of clarity. The outputs of the inverters 262 constitute the seven bit parallel output of the multiplexer. Since the outputs of all of the shift registers 256-259 are continuously connected to the inputs of the open collector inverters 261, it is essential that inactive shift registers 256-259 present a code of all zeros to the multiplexer in order that the data processed by the multiplexer only apply to the active shift register, i.e., the shift register being clocked. In other words, the outputs of three of the four shift registers 256-259 must have zero (low level) outputs so that their interconnection with the multiplexer will not interfere with the signal output of the active shift register. The output of the multiplexer 260 thus corresponds only to the output of the shift register 256-259 that is being clocked to recirculate data at that time. The inverters 262 may be inverters type SN4704.

The seven bit outputs of the multiplexer 260 are applied to a Read Only Memory, for example, in the form of a plurality of ROMs 263-268. The ROMs 263-268 are enabled sequentially, in dependence upon the number of the scan line in the given character line being displayed, whereby the output of the energized ROM corresponds to the pattern of dots for a given portion of a character in the scan line. For example, if at a given time a seven bit signal corresponding to a given letter is applied to the ROMs 263-268, the ROM enable signals A-G corresponding to the dots to be produced in a portion of a given scan line of that character will appear at the output of the activated ROM. In the present example, each of the ROMs 263-268 was comprised of a pair of PROMs of type 82529 in order to provide eight output lines for characters having a maximum width of eight dots.

In the above described example, wherein the basic format for character display is eight dots wide by twelve dots high, it must, of course, be insured that the ROMs have adequate capacity for storing all of the necessary data for this format for each character to be displayed. The ROMs 263-268 constitute a dot generator.

Corresponding outputs of the ROMs 263-268 are interconnected, with the resultant lines being connected to set the stages of an eight bit shift register 269 separately. The eight bit shift register 269 is enabled by a load video signal, to be described in greater detail in the following paragraphs, and the four mHz dot clock is applied to the shift register 269 to shift the stored data to a video output line 270 for application to a cathode ray tube 271 or other display device. The display device is provided with conventional vertical and horizontal deflection generators 272 and 273 respectively.

As above discussed, with reference to FIG. 3, the display in accordance with one embodiment of the invention has four lines. Further, each of the shift registers 256-259 of FIG. 10 stores data corresponding to a separate display line. As further discussed above, the shift registers 256-259 are sequentially clocked, so that the data stored therein is sequentially applied to the dot generator, and thence to the display device. The correspondence between the shift registers 256-259 and line being displayed is dependent, however, upon the synchronization of the memory clock signals with respect to the vertical deflection of the display device. For example, assume that at one time the shift registers 256-259 store data displayed sequentially from the top to the bottom lines on the display, whereby the shift register 259 corresponds to the data entry line. If, now, a carriage return signal CR is stored in the shift register 259, the synchronization between the shift registers and the display will be changed, by circuits to be later described, so that the data stored in shift register 257 will now be displayed in the top line of the display, the data stored in shift registers 258 and 259 will be displayed in the second and third lines of the display, and the data stored in the shift register 256 will be erased to enable entry of new data for the fourth line of the display. The displayed data thus rolls upwardly on the display device. In some cases, as will be discussed later in the specification, the display may also be controlled to roll downwardly. Thus, in the arrangement illustrated in FIG. 10, coded data signals from the keyboard are simultaneously applied to each of the shift registers 256-259, but data is only entered into a shift register when a Load Circulate signal appears to place that shift register in a data entry mode, and the shift register is being energized by a Memory Clock signal. The data stored in each shift register, in the absence of a Load Circulate signal, recirculates only when that shift register is receiving Memory Clock signals and hence, only the output of one shift register is applied at any given time to the dot generator formed by the ROMs 263-268. The ROMs 263-268 are programmed so that, in response to enabling signals corresponding to the given scan line scanned on the display at that instant, the shift register 269 is loaded in accordance with the determined dot display, for read out by the dot clock to the display device.

In the circuit of FIG. 10, a seven bit output of the multiplexer 260, corresponding to data stored in one of the shift registers at any given instant, is also applied to Space Bit ROM 275. This Read Only Memory is programed to provide an output signal on one of its three output lines, in accordance with the coded signal applied instantaneously thereto from the active shift register 256-259. Thus, a first output from the Read Only Memory 275 is provided in response to a stored word space. The two other outputs of this Read Only Memory correspond to preassigned widths of characters, etc., for display, whereby the second output of the ROM 275 appears if the character has been assigned a width of two unit spaces and a third output of the ROM 275 appears if the character to be displayed has a preassigned width of unit spaces. A character preassigned a width of four unit spaces is indicated by an absence of any of the outputs of the ROM 275. A fixed space may be assigned, for example, a width of two unit spaces, whereby storage of the corresponding signal in the active shift register results in an output at the second output line of the ROM 275. These logic signals will be employed, as will be later described, in order to enable proportional display of the characters in the display lines.

In addition, the seven bit output of the multiplexer 260 is applied to a NAND gate 276, for decoding the seven bit data and producing a Memory CR signal, corresponding to the presence of data at the output of the multiplexer 261 corresponding to a stored carriage return signal.

The seven bit output of the multiplexer 260 is also applied to a Tab decoder 277, for the production of a Memory Tab signal in response to the occurrence of data at the output of the multiplexer corresponding to a stored Tab signal in the shift register 256-259 currently being read out. The decoders 276 and 277 may, for example, be BCD-decimal decoders.

The seven bit outputs of the multiplexer 260 also provide a Memory Output signal at terminals 278, for further use in the apparatus in accordance with the invention.

CHARACTER CLOCK GENERATOR

Since the scanning display device, such as cathode ray tube 271, is being scanned at a constant rate, the display of proportional characters requires the generation of clock signals corresponding to the displayed characters, so that the shift register memory 256-259 may be stepped at a rate corresponding to the width of character data stored therein. For this purpose, a character clock generator as illustrated in FIG. 11 is provided.

As discussed above, space bit ROM 275 is connected to the output of the multiplexer 260 (FIG. 10) to provide an output at one of its terminals, dependent upon whether the signal output from the multiplexer was a word space, or a character to be displayed with two or three unit space bits. As illustrated in FIG. 11, the outputs of the space bit ROM 275 are applied to separate input terminals of an eight bit shift register 290. It would be possible also to provide an output of the space bit ROM 275 corresponding to four unit spaces, although this is unnecessary since, in the absence of one of the above outputs of the space bit ROM, the eight bit shift register 290 will be set to a code corresponding to four unit spaces. The output of the last stage of this shift register 290 is connected to a second shift register formed by three cascade-connected JK flip flops 291, 292, and 293, the Q output of shift register 293 is connected by way of a negated input of OR gate 293 to one input of NAND gate 294, the other inputs of the NAND gate 294 being derived from the Q̄ output of flip flop 291 and the Q̄ output of flip flop 292. The output of gate 294 is connected directly to the K input, and by way of inverter 295 to the J input of JK flip flop 296. The JK flip flop 297 is cascade-connected with the output of flip flop 296. The Q output of flip flop 297 is connected to a second negated input of OR gate 293. The JK flip flops 291, 292, 293, 296 and 297 constitute a shift register clocked by a Logic Clock output of edge-triggered D type flip flop 298. The Unit Space Clock is connected to the clock terminal of flip flop 298, and the D terminal of this flip flop is a Justification Control signal for "stretching" word spaces in a justified line. For the present, however, the Justification Control signal can be ignored, and it can be considered that the Logic Clock steps at the rate of the Unit Space clock. With this arrangement, it is apparent that data loaded into the shift register 290 is shifted to the shift register comprising flip flops 291, 292, 293, 296 and 297 at the Unit Space clock rate, and hence the output signals at the various stages of this latter shift register are a function of the data entered in the shift register 290.

The Q output of flip flop 291, and the Q̄ outputs of flip flops 292 and 296 are applied to a NAND gate 298, whereby an output is produced from the NAND gate timed with the end of a character to be displayed. Similarly, the output of the NAND gate 294 corresponds to the time of the end of a word space. The truth table for the production of the End Character and End Word Space signals is illustrated in FIG. 12. The Character Clock is produced, for controlling the stepping of the memory shift registers 256-259 of FIG. 10, in response to either the end of a character or the end of a word space, and hence the End Character and End Word Space signals are applied by way of separate negated inputs of OR gate 299 to one input of AND gate 300. Synchronism with the Logic Clock, and hence the Unit Space Clock, is established by applying the Logic Clock to the other input of the AND gate 300. The output of the AND gate 300 thus constitutes the Character Clock stepping at a rate dependent upon the width of the character or word space. The Load Video signal for enabling the eight bit shift register 269 of FIG. 10 must also occur at the end of a character or word space, in order to load the shift register 269 with new data, and hence the Load Video signal is derived from an AND gate 301 in FIG. 11, having as inputs the output of the OR gate 299, the Dot Clock and the Unit Space Clock. The Video Blank signal is also applied to the AND gate 301, which enables the loading of video except during the last four scan lines of each character line, or during the first sixteen scan lines. It is not necessary to load the outputs of the ROMs 263-268 into the shift register 269 of FIG. 10 at such times, since there is no display to be presented.

The output of the OR gate 299 is also applied as one input of a NAND gate 302, the other input of the NAND gate being formed by the output of inverter 303 connected to the Logic Clock. The output of the NAND gate 302 loads the shift register 290 with data presented by space bit ROM 275.

It is apparent, of course, that shift registers of other forms may be employed in place of the shift register formed of JK flip flops illustrated in FIG. 11.

The shift register flip flops 291, 292, 293, 296 and 297 are reset by the output of an AND gate 303 having as inputs the negated Q output of flip flop 298, and the left margin count signal. The flip flops are thus unconditionally reset at the left margin.

It is to be noted that the Load Video signal constitutes a pulse signal, with the times between these pulses corresponding to the widths of the characters or word space. In the arrangement of FIG. 11, the shift register 290 was a type SN 74165 eight bit shift register, the JK flip flops 291 and 296 were type SN7476 JK master slave flip flops having preset and clear terminals, and the flip flops 292, 293 and 297 were separate sections of SN 74107 dual JK master slave flip flops.

DECODER CLOCK CIRCUIT

While, as above discussed, it is desired to step the memory shift registers 256-259 at a rate corresponding to the widths of the characters stored therein, for some purposes it is desirable to step the shift registers at a faster rate at the end of a line, following a Carriage Return signal. For example, if only a few short words are entered at the beginning of a line, and the space bar is struck to extend the printing portion to the justification area, then during justification the space must be stretched between the words until the last character appears at the right margin. As a consequence, the memory shift register, such as shift registers 256-259 of FIG. 10, will only be stepped partially through their cycle, although the scan has progressed across the display. In order to complete the recirculation of the shift register prior to the beginning of the next scan line, it is then necessary to step the shift register many unit spaces to arrive at its initial starting point prior to the activation of the next scan. For example, if three letters spaced by word spaces were entered at the beginning of the line, it would be necessary to shift the shift register 75 steps before the activation of the next shift register. In order to insure that the shift register is circulated completely during the time of each scan line, it is thus necessary to provide means for stepping it at a faster rate than at the rate of the Character Clock following the occurrence of a Carriage Return signal.

A circuit for modifying the Character Clock to meet this requirement and to thereby provide a Decoder Clock, is illustrated in FIG. 13.

Referring now to FIG. 13, the Character Clock is applied to one input of a NAND gate 325, and the Unit Space Clock is applied to one input of a NAND gate 326. These NAND gates are activated in response to the Q and $\overline{Q}$ outputs of a JK flip flop 327 having fixed potentials applied to its J and K inputs. The flip flop 327 is reset by the Left Margin Count, thereby the $\overline{Q}$ output of the flip flop 327 activates the other input of AND gate 325, to enable the passing of Character Clock pulses by way of OR gate 328 to one input of a NAND gate 329. The other input of the NAND gate 329 is the Q output of an edge-triggered D type flip flop 330 having its D terminal connected to a fixed potential. The flip flop 330 is clocked by the Left Margin Count, and hence at the Left Margin Count the NAND gate 329 is activated, to produce a Decoder Clock at its output, the Decoder Clock at this time stepping at the rate of the Character Clock. When a Memory CR signal is produced, in response to the occurrence of a Carriage Return signal at the output of the multiplexer 260 of FIG. 10, this signal will clock the flip flop 327, to the "set" state, to deactivate the AND gate 325, and to activate the AND gate 326. The Character Clock is hence blocked by the NAND gate 325, and the Unit Space Clock is applied by way of the NAND gate 326, OR gate 328 and NAND gate 329 to the Decoder Clock output, whereby the Decoder Clock, following the occurrence of a Memory CR signal, steps at the rate of the Unit Space Clock.

The flip flop 330 is reset upon the occurrence of the 80th (eightieth) character in a scan line, the detection of which will be discussed in the following paragraphs, and hence the Decoder Clock is only active from the left margin of the display until the eightieth character of the scan line. It is thus apparent that, during this period, the Decoder Clock initially steps at the rate of the Character Clock, until the occurrence of a Memory Carriage Return signal, whereupon it proceeds at the faster rate of the Unit Space Clock until the eightieth character position, indicating that the active memory, one of 256-259 FIG. 10, has recirculated completely and is ready for the next scan line. The Q output of the flip flop 330 also constitutes a Memory Active signal for further use in the apparatus.

For use in some types of printers, it is desirable to provide a Character Space Data signal. The Character Space Data is used to define carriage motion on some types of printers. This signal is also produced in the circuit of FIG. 13, by clocking a JK flip flop 335 at the rate of the character clock, the J and K terminals of the flip flop being connected to opposite fixed polarities. The $\overline{Q}$ output of the flip flop 335 and the output of the NAND gate 325 are applied to separate negated inputs of an AND gate 336 for producing the Character Space Data signal. The negated output of the flip flop 335 constitutes a Delete-First bit signal. As mentioned above, the character space data is used to define carriage motion. Since the normal sequence, in a printer, is to first strike the character and then increment the carriage, the first data bit is inhibited so as to not first increment the carriage.

The flip flops 327 and 335 are reset by the Left Margin Count. The resetting of the flip flop 327 thus enables the Decoder Clock to step with the Character Clock at the start of a scan line after the Left Margin Count.

INITIALIZING CIRCUIT

At this time the circuit for generating the various signals for setting the circuits of the equipment initially will be disussed. In general, the initialization is effected by the production of a NULL strobe signal. If desired, a separate reset key may be provided on the keyboard for the generation of this signal, in order to effect total erasure of the memories and resetting of all circuits. The reset signal may also be generated as a pulse, for example, by further depression of the ON-OFF button, if the OFF button does not otherwise remove all power from the apparatus. While the reset signal may be a pulse, it may also be a continuous signal since the initializing signals are generated by the use of flip flop circuits, i.e., "power-on voltage level".

Referring now to FIG. 14 the initializing circuit is comprised of a latch in the form of a D type edge triggered flip flop 350, and a two stage shift register consisting of D type edge triggered flip flops 351 and 352.

As will be recalled, with reference to FIG. 10, a BS signal along with a Function Strobe signal, corresponding to depression of a backspace key is produced by the decoder 254. A NULL strobe signal along with the BS signal corresponding to the activation of the reset key is produced at a subsequent time by the decoder 254. As mentioned above, the reset key may be mechanically linked to the on-off switch. During either the backspace function, or the reset function, the BS signal is applied to the D input of the flip flop 350. However, only during the reset function is this flip flop clocked by the NULL strobe. The Q output of the flip flop 350 is applied to the D input of the flip flop 351, and the Q output of the flip flop 351 is applied to the D input of the flip flop 352. The flip flop 351 and 352 are clocked by the Scan Line 80 pulses. The Q output of the flip flop 351 comprises an Initialize signal, and the $\overline{Q}$ output of this flip flop constitutes a Clear 1 signal. The $\overline{Q}$ output of flip flop 352 resets the flip flops 350 and 351, and also constitutes a Clear 2 signal. The sequence of generation of these pulses is shown in FIG. 15, wherein it is seen that the Clear 1 and Initialize signals appear during the first scan (80 scan lines) following the generation of the NULL strobe, and are of opposite senses, and the Clear 2 signal is generated during the second scan following the occurrence of the NULL strobe.

The uses of these signals in the initializing of the circuits of the apparatus will be discussed with reference to the specific circuits themselves.

COUNTING AND COINCIDENCE CIRCUITS

Referring now to FIG. 16, in order to cyclically activate the memories, and to store information corresponding to the activated memories, a memory line position counter 375 is stepped by a line position count signal. As will be discussed in greater detail in the following paragraphs, the line position count is produced either in response to a line count pulse, or a CR pulse, in the absence of a requirement for roll down of the lines. The counter 375 recycles, and has a maximum count corresponding to the number of storage memories. For example, in the present example, the counter 375 may be a 2 bit counter, comprised, for example, of a pair of JK flip flops. This counter is reset by the Clear 2 pulse. The output of the counter 375 is a 2 bit parallel code, which is applied to a comparator 376 and a decoder 377. The decoder 377, which may be, for example, a BCD to decimal decoder type SN7442, has four outputs, i.e., memory clocks 1, memory clock 2, memory clock 3 and memory clock 4, which are applied as clock signals to the separate shift registers 256-259 of FIG. 10 as above discussed.

Referring again to FIG. 16, the Decoder Clock and the Scan Lines 1-16 signals are also supplied to the decoder 377. In response to the 2 bit input from counter 375, the 4 outputs of the decoder 377 are sequentially activated to pass Decoder Clock pulses for sequentially clocking the memory shift registers 256-259 of FIG. 10. Since there is no display during scan lines 1-16, the Scan Lines 1-16 signal blocks the decoder 377 during this time.

In a preferred embodiment of the invention, each memory shift register 256-259 of FIG. 10 has a length of 80 bits, and thereby complete recirculation requires the application thereto of 80 memory clock pulses. It will be recalled, with reference to FIG. 13, that the Decoder Clock pulses occur in sequence of 80 pulses, and consequently, during the activation of each memory shift register 256-259 of FIG. 10, 80 memory clock pulses are applied thereto before activation of the next memory shift register.

The Decoder Clock is also applied to a memory character position counter 378, which provides a parallel 7 Bit Coded Data output corresponding to the count of the input pulses. The two of the output bits of the counter 378 which correspond to a count of 80 are applied to AND gate 379 for producing an 80 Character Reset signal, this signal being applied to reset the counter 378. The counter 378 thereby counts to the count of 80 during each scan line. The 7 bit data output of the counter 378 is applied to the comparator 376, and also to a data entry character address counter 380. The 7 Bit Data is not entered into the counter 380, however, until instructed by a Load 7 Bit Data signal, which will be discussed in greater detail in the following paragraphs.

The memory character position counter 378 thus continuously defines the position of data in the activated memory storage register 256-259, while the memory line position counter 375 continuously defines the address of the currently activated memory shift register 256-259 of FIG. 10.

The data entry character address counter 380 may be an up-down counter, for example including one or more counters of the type SN74193. The count in this counter is stepped up 1 count in response to a Character Countup signal, and stepped down one step in response to a Character Countdown signal, the origin of these signals being discussed in the following paragraphs. For the moment it suffices to say that these signals correspond to changes of the data entry position, in the data entry line. The 7 bit output of the data entry character address counter 380 is applied to the comparator 376 for comparison with the 7 bit data output of counter 378. As discussed above, the 7 bit data applied from the counter 378 to the counter 380 is not automatically entered therein, its entry being dependent upon the occurrence of a Load 7 Bit Data signal. This feature is required when the lines on the display are shifted downwardly, at which time the count of the data entry character address counter 380 will no longer correspond to the last data character displayed in the data entry line. The load 7 bit data signal occurs at the time that the count stored in counter 378 corresponds to the last effective printing position of data so shifted into the data entry line, in order to update the data entry character address counter to the correct count.

The data entry character address counter is reset by the Initialize signal, by way of an OR gate 381, and also by a Data Entry Line Up Count signal responsive, for example, to the depression of a carriage return key. This feature will be discussed in greater detail in the following paragraphs.

The data entry line address counter 382 is an up-down counter, and may be comprised, for example, of a type SN74193 up-down counter. This counter stores the address of the memory shift register 256-259 of FIG. 10 corresponding to a data entry line, i.e., a line in which data may be entered. Referring to FIG. 16, the data entry line address counter 382 is stepped up by a Data Entry Line Up-Count signal, and is stepped down by a Data Entry line Down Count. This counter is reset by the Clear 2 signal.

The two bit output of the data entry line address counter 382 is applied to the comparator 376 for comparison with the 2 bit output of the memory line position counter 375. Upon coincidence between the counts of counters 380 and 378, and the counts of counters 382 and 375, a coincidence output pulse will be produced by the comparator 376. It is to be noted that this coincidence pulse is produced once during each scan of the data entry line. In response to the depression of a character key, and along with logic to be described in greater detail, the coincidence pulse defines the exact location in memory where the character data is to be stored. A Mark print position signal is generated by an inverter 383, and will be discussed in greater detail in the section herein concerned with Video Markers.

The effect of counting of the data entry line address counter 382 and the memory line position counter 376, is illustrated in FIGS. 17a, 17b, 17c, and 17d. Referring to FIG. 17a, the display lines are indicated vertically in the first column, and the second column assumes, at a given time, the correspondence between the Memory Clock signals and the displayed lines. Thus, in such case the Memory Clock signal 1 corresponds to line 1 of the display, the Memory Clock signal 2 corresponds to the second line of the display, etc. It is also assumed, that, at this time, the data entry line address counter 382 has stored therein the address of the 4th memory shift register 259. As a consequence, at the printing position a coincidence pulse will be produced during the 4th line of the display when the Memory Character position counter 378 matches the data entry character address counter 380.

If now a carriage return key is depressed on the keyboard, an Up Count signal will be produced, as will be later described, for counting the counters 375 and 832 one step upward. As a result, the synchronization between the Memory Clocks and lines of the display will be changed, whereby Memory Clock signal 1 now corresponds to display line 2, etc. The data entry line stored in counter 382 now corresponds to the 3rd memory shift register, and as a result, at the active or data entry position, a coincidence pulse is produced during the 4th line of the display, when counters 378 and 380 coincide.

Upon a further depression of the carriage return key, as illustrated in FIG. 17c, the Memory Clock and the data entry line will again be advanced, in which case, the memory clock 3, corresponding to the 3rd memory shift register, stores the data for display in display line 1, the Memory Clock 4, corresponding to the data stored in the 4th memory storage register is displayed in display line 2, etc. At this time, Memory Clock 2 corresponding to the second memory shift register will correspond to the data entry line.

The sequence may be reversed, as illustrated in FIG. 17d, where, for example, upon the occurrence of a Roll Down Count Delete signal, (to be discussed in greater detail in the following paragraphs), a line pulse which steps the counter 375 is deleted. In the sequence shown in FIG. 17d, the 3rd memory shift register now corresponds to the data entry line, and the Memory Clock signal 3 corresponds to the 4th line of the display. The sequence illustrated in FIG. 17d has thus returned to the sequence of FIG. 17b.

It is thus apparent that the memory line position counter 375 produces a count which defines the relationship between the active memory shift register 356-259 of FIG. 10 and the lines of the display, while the data entry line address counter 382 continuously stores the address of the memory which corresponds to the data entry line, i.e., the line at which data may be entered. In the preceding example, it has been assumed that the bottom display line corresponds to the data entry line.

SEQUENCING CIRCUITS

FIG. 18 illustrates, in block form, sequencing circuits for the apparatus in accordance with the invention. The first portion of this circuit can be considered to be a data entry sequencer, and is comprised of a latch formed by an edge triggered D type flip flop 400 cascade connected with a three stage shift register comprising JK flip flop 401, JK flip flops 402 and JK flip flop 403. The flip flop 400 is clocked by the Data Strobe, the flip flop 401 is clocked by the Data Entry Clock, and the flip flops 402 and 403 are clocked by the End Scan Line pulse. A CR-complete signal, generated in the circuit of FIG. 18, is supplied by way of an inverter 404 to the D input of flip flop 400. For the present, however, this signal may be ignored, and it may be assumed that the D input of this flip flop has a logic high level. The flip flops 400 and 401 are reset by the $\overline{Q}$ output of the flip flop 402.

This circuit produces 3 outputs, i.e., A T1 count-up output from the Q output of flip flop 401, a T2 load data output from the Q output of flip flop 402 and a T3 signal from the $\overline{Q}$ output of flip flop 403. The T1 output is applied to an AND gate 405, to produce the Character Countup signal. The other input of the AND gate 405 is assumed at the moment to be at its logic high level, and as will be discussed in further paragraphs, serves to inhibit character counting up when a backspace key is depressed. The T2 signal is applied to one input of AND gate 406, the other input being formed by the Coincidence signal, the output of the AND gate 406 being an "Enter Data" signal, which is applied by way of an OR gate 407 to form the Load Circulate signal for enabling the memory shift registers 256-259 of FIG. 10 to receive data for storage.

The $\overline{Q}$ output of flip flop 400 forms the Delayed Data Strobe signal, which is delayed with respect to the Data Strobe signal. The Delayed Data Strobe signal was referred to in the description of decoder 254 of FIG. 10.

FIG. 19 illustrates the operation of the sequencing circuits so far described. This drawing illustrates a sequence of scan lines 64-72, since most of the related control occurs during this period as well as the next three following End of Scan Line pulses at the ends of the frame corresponding to the shown scan lines 64-72, as well as the ends of the next succeeding frames. As will be recalled, the End Scan Line pulses occur at the end of each scan line at the same time as the display horizontal synchronization pulse, whereas the Data Entry Clock signals only occur at scan lines 65-72. Coincidence pulses will be produced during the scan lines 65-80, upon coincidence between the address of the active memory shift register 256-259 of FIG. 10 and the address stored in memory line position counter 375, as well as coincidence between the active or data entry position stored in data entry character address counter 380 and the count stored in memory character position counter 378.

As will be recalled, a Data Strobe signal is produced in response to the depression of a key on the keyboard, and this may occur at any time. The Data Strobe latches the flip flop 400, whereby at the occurrence of the next Data Entry Clock signal the flip flop 401 changes state to produce the T1 signal. In the absence of a backspace signal, the T1 signal constitutes the Character Countup signal, and counts up the data entry character address counter 380. This effect is illustrated in FIG. 19, with the displacement of the coincidence signal at the time of occurrence with the T1 signal.

At the termination of the next End of Scan pulse, the T2 signal is generated, resulting in the release of the T1 signal and the Q output of latched flip flop 400. When a coincidence pulse occurs, upon actuation of the T2 signal, an Enter Data signal is produced, resulting in the production of a Load Circulate pulse at the output of OR gate 407. The Load Circulate pulse, as above discussed, enables the memory shift register 256-259 corresponding to the data entry line to receive and store data at the position in which the Coincidence pulse corresponds. A high or positive level on the Load Circulate signal causes memory clock signals to store data in memory, while a low or ground level on the Load Circulate signal causes memory clock signals to circulate data stored in memory. The T2 pulse is reset by the T3 pulse, which starts at the termination of the next succeeding end of scan line pulse, and terminates at the end of the following end scan line pulse. The T3 signal is employed for initiating a carriage return sequence, if the carriage return key has been depressed, and this feature will be discussed in more detail in the following paragraphs.

The sequencing, in the event of the striking of a backspace key, is controlled in the arrangement of FIG. 18 by a latch comprising a D type edge triggered flip flop 410, and a JK flip flop 411. The BS signal is applied to the D terminal of flip flop 410, and this flip flop is clocked by the Function Strobe pulse which occurs with a delay following the BS signal. The $\overline{Q}$ output of flip flop 410 is applied as the second input to AND gate 405, and the Q output thereof is applied to the J terminal of flip flop 411. The K input of the flip flop 411 is grounded, and this flip flop is clocked by the Enter Data output of AND gate 406. The $\overline{Q}$ output of flip flop 411 constitutes the Character Countdown signal. The flip flops 410 and 411 are reset by the T3 pulse.

The control effected by the operation of the backspace key in this instance is illustrated in lines k-m of FIG. 19. Thus, in line k it is shown that the flip flop 410 is latched upon the occurrence of the Function Strobe signal, this latch not being released until the occurrence of the T3 pulse. As a consequence, the AND gate 405 is locked during the occurrence of the T1 pulse, due to the low level at the $\overline{Q}$ output of the flip flop 410, so that a Character Count Up pulse is not produced at the output of AND gate 405. The Enter Data signal, and hence the Load Circulate signal is produced as shown in line 1 in the same manner as shown in line j, and hence, data may be entered into the memory shift register 256-259 corresponding to the data entry line during the occurrence of the T2 pulse, at the occurrence of the Coincidence pulse. At this time only the data corresponding to a backspace signal is applied to the memory shift register corresponding to the data entry line, and as a consequence, data previously entered at this position will be overwritten by a backspace entered therein. Since the code corresponding to a backspace signal does not result in the production of a character on the display, any previously displayed character at this position will be erased. The $\overline{Q}$ output of the flip flop 411, which occurs in response to the Enter Data signal, results in the count down of the data entry character address counter. The Character Count Down signal is released by the signal T3, which resets the flip flops 410 and 411.

In the event that the Data Strobe was in response to the depression of a carriage return key, a carriage return sequence is initiated in a circuit comprised of a latch in the form of the edge triggered flip flop 421, JK flip flop 422, D type edge triggered flip flop 423, D type edge triggered flip flop 424 and JK flip flops 425. The CR signal is applied to the D terminal of flip flop 420, which is clocked by the Function Strobe signal. The Q output of flip flop 420 is applied to the D terminal of flip flop 421, which is triggered by the T3 signal by way of OR gate 426. The Q and $\overline{Q}$ outputs of flip flop 421 are applied respectively to the J and K terminals of flip flop 422, which is clocked by the End Scan Line pulse. The $\overline{Q}$ output of flip flop 421 forms the T4 signal, i.e., the Data Entry Line Up Count for stepping the data entry line address counter 382 in the up direction and resetting the data entry character address counter shown in FIG. 16.

Referring again to FIG. 18, the $\overline{Q}$ output of the flip flop 422 resets the flip flops 420 and 421, and sets the flip flop 423, the D and C terminals of this latter flip flop being connected to ground reference potential. This flip flop is thereby connected as a set-reset flip flop. The $\overline{Q}$ output of the flip flop 423 is applied to the D terminal of flip flop 424, which is clocked by the Scan Line 80 pulse. The Q output of flip flop 424 is applied to the J terminal of the flip flop 425 and the $\overline{Q}$ output of flip flop 424 is applied to the K terminal of flip flop 425, and also constitutes the T5 signal, which is applied to one input of OR gate 427. The Line Count pulse is also applied to OR gate 427, and the output of OR gate 427 is applied to one input of AND gate 428, the output of AND gate 428 constituting the Line Position Count signal for stepping the memory line position counter 375 of FIG. 16.

Returning to FIG. 18, the Q output of flip flop 425 constitutes a CR complete signal, indicating that a carriage return sequence operation has been completed, and this signal is also applied to the inverter 404 at the input of data entry sequence latch flip flop 400. The Q output of flip flop 425 resets flip flops 423 and 424.

The carriage return sequence circuit also includes a D type edge trigger flip flop 429 clocked by the T3 signal and having its D terminal connected to the Q output of latch flip flop 420. The $\overline{Q}$ outputs of this flip flop constitutes the Keyboard Disable signal. The flip flop 429 may be reset by the end of a Printer Busy signal, which also clocks the flip flop 421 by way of OR gate 426. The Printer Busy signal is derived in a hard copy printer which may be connected to the apparatus, for indicating that the printer is in operation in printing a justified line corresponding to the first line of the display. Thus, in one application of a system in accordance with the invention in combination with the printer, the justified line appears as a top line of the display, and the data entry line appears as the bottom line thereof. If the carriage return key is depressed upon completion of entry of data into the data entry line, the hard copy printer will be activated to print the data appearing in the top line of the display. The operator may continue to type a new data entry line while the printer is printing the previously justified top line. If, however, the operator again strikes the carriage return key before printing of the previously justified line is complete, the Printer Busy signal from the printer will inhibit the T3 signal from clocking flip flop 421 since the Printer Busy signal is active on the clocking terminal of this flip flop, by way of NOR gate 426. Since the carriage return key has been depressed, the flip flop 429 will be set by the T3 signal and the output of the flip flop 429 will disable the keyboard. The operator must now wait for the printer to complete its printing operation, prior to continuing typing. This condition may occur at the end of a paragraph, where the last line is very short, or where two carriage return keys are depressed for double spacing. When the printing operation is completed, it is not necessary to again depress the carriage return key, since the depression of the key has been stored in the flip flop 420, and the termination of the Printer Busy signal clears the keyboard disable function of flip flop 429 and enables the clocking of flip flop 421.

The carriage return sequencing circuit further comprises an AND gate 431 having the scan line 80 signal applied to one negated input and the $2^3$ output of the scan line counter 212 (FIG. 9) applied to the other negated input. The output of the AND gate 431, which is applied to one input of an AND gate 432, thus selects alternate groups of 8 scan lines in the absence of a Scan Line 80 pulse. The CR complete signal is connected to the second input of the AND gate 432, and the third input thereof is derived from the $2^6$ output of the scan line counter 212 of FIG. 9. The $2^6$ output appears only during scan lines 64–80, and hence selects a group of 8 scan lines from 64–72. The output then from the AND gate 432 is only active during scan lines 64–72, if a CR complete signal is present. In this circuit the scan line 80 pulse eliminates a short pulse that may otherwise appear due to counter cross over during reset of the counter 212.

The output of the AND gate 432 constitutes a Roll Over Clear signal, and is applied as a second input to the OR gate 407 to form the Load Circulate signal. It is to be noted that the Clear 2 signal is also applied as an input to the OR gate 407, for clearing the memories during an initializing operation. As will be discussed in the following paragraphs, the Roll Over Clear signal clears data in the top line, after printing, and before the shift registers are addressed as the data entry line.

In the operation of the apparatus, in the absence of the depression of a carriage return key, the memory line position counter 275 of FIG. 16 must be stepped in synchronism with the line count pulses, so that the sequence appearing, for example, in FIG. 17 is obtained. For this purpose, the Line Count pulses which occur at the beginning of each line are directed by way of the OR gate 427 and AND gate 428 of FIG. 18, to produce the Line Position Count signal for stepping the memory line position counter of FIG. 16. For the moment it will be assumed that the other input of the AND gate 428 of FIG. 18 has a high logic level to pass these pulses, the AND gate 428 only being blocked in rolled down operation which will be discussed in the following paragraphs.

When a carriage return key is depressed, it is necessary to add an additional pulse for stepping the memory line position counter 275 of FIG. 16, to produce the results illustrated in FIG. 17, and the carriage return sequencing portion of the sequencing circuit illustrated in FIG. 18 serves this function, as well as related functions in the carriage return operation.

Referring now to FIG. 19, if the Data Strobe pulse was responsive to the depression of a carriage return key, the flip flop 420 will be latched as shown in line n of FIG. 19, thereby enabling the flip flops 421 and 429. The signal T3, which may be considered to be a Check for Carriage Return signal, consequently sets each of the flip flops 429 and 421, as illustrated in line so and p respectively of FIG. 19. (Since flip flop 429 is held reset by a Printer Busy signal, this flip flop will only be set if a printing device attached to the system is in the process of a printing operation.). The CR signal will already have been entered in the data entry line, due to the production of the memory control signal of line j during the occurrence T2 signal shown in line h. The Q output of the flip flop 421, which constitutes the Data Entry Line up-count signal T4 now steps up the data entry line address counter 382 of FIG. 16 in accordance with the sequences shown in FIGS. 17B and 17C. The signal T4 is released upon the next end scan line signal due to the clocking of the flip flop 422, the function of the signal T4 now having been effected, and the latch flip flop 420 is also released at this time.

The setting of the flip flop 422 effects the setting of the flip flop 423, and hence the enabling of the flip flop 424. Upon the next occurring Scan Line 80 pulse, the flip flop 424 is clocked to initiate the T5 signal at its Q output, as shown in FIG. 19q. The T5 signal results in the production of a Line Position Count pulse, by way of OR gate 427 and AND gate 428 to thereby also step the memory line position counter 375 as illustrated in FIG. 16. The production of the T5 signal effects the setting of the flip flop 425 at a time of release of the T5 signal, thereby resulting in the initiation of the CR Complete signal, as shown in line r of FIG. 19. The CR complete signal is released upon the next succeeding Scan Line 80 pulse.

As discussed above, the AND gate 432 produces a Roll Over Clear output only during scan lines 64–72, in the presence of a CR complete signal. Hence, a Roll Over Clear signal is produced as illustrated in line s of FIG. 19 during the occurrence of the CR Complete signal. The Roll Over Clear signal forces the Load Circulate signal into the load mode, by way of the OR gate 407, to enable entry of data in the data entry line. The Keyboard Disable signal is active during roll over clear due to signal through OR gate 432, zero or null coded data is thus output from the keyboard, and hence at the time of occurrence of the Roll Over Clear signal there will be null data to be entered in the data entry line. As a result, the presently active data entry line is cleared, i.e., the memory shift register 256–259 of FIG. 10 is cleared of all data. This function is necessary, since the data appearing in the first line of the display would otherwise be shifted to the fourth, i.e., data entry, line of the display, and the Roll Over Clear signal thereby enables the erasing of this data in the corresponding memory so that the data entry line following a carriage return operation is cleared.

While the various above-described signals have been indicated to have been set and reset, for example, in response to the Scan Line 80 pulses, it will be apparent that the selection of the times of occurrence of these signals is dependent upon the time required for accomplishing of the desired functions, and consequently other timing control may be effected, as long as the required operations are effected. The above-described arrangement thus constitutes a readily convenient system for the production of the signals.

ROLL DOWN

As above discussed, the display lines roll up in response to the depression of a carriage return key. On occasion, it is desirable to provide means for enabling the display to roll down. For example, if the active printing or data entry position is at the left margin of the data entry line, and the back space key is depressed, obviously the operation of the back space key will have no effect, unless it is caused to have effect in the third line of the display. It is a feature of the invention that the third line of the display can be rolled down upon depression of the backspace key, so that the backspace operation may be continued with respect to data in this line. In this event, the first, or justified line of the display must be moved downwardly to the second line of the display, and hence the data entry line, now cleared but not necessarily so as explained below, is moved to the top position, line 1. The roll down feature may further be desired in response to a specific control by the operator which may be considered to be a platen roll down controlled by the operator. If the latter feature is also desired, a roll down key may be provided on the keyboard, for producing a Platen Roll Down signal.

The above operations are effected in the circuit of FIG. 18 by means of a latch comprised of a D-type edge triggered flip flop 450, a further D type edge-triggered flip flop 451, a JK flip flop 452 and a NAND gate 453.

The flip flop 450 is enabled by the coincidence signal, and is clocked by the End Scan Line pulses. The Q output of this flip flop clocks the flip flop 451, and is applied as one input to the NAND gate 453. The Q output of backspace flip flop 410 enables the flip flop 451, and the $\overline{Q}$ output is applied to the other input of AND gate 453. The Q and $\overline{Q}$ outputs of flip flop 451 are applied to the J and K terminals respectively of flip flop 452, this flip flop being clocked by the output of OR gate 427. The $\overline{Q}$ output of flip flop 452 resets the flip flop 451, sets RS flip flop 454, is applied to the other input of AND gate 428 for blocking the End Line position count, and constitutes a No-Count signal for justification purposes. The Q output of the flip flop 454 is applied as one input to AND gate 455, with the Memory CR signal being applied to the other input of this AND gate. The output of the AND gate 455 constitutes the Load Seven Bit Data signal.

As discussed above, a series of eight coincidence pulses occurs during the scan lines of the data entry line, upon a coincidence of the counts in the data entry character address counter 380 and memory character position counter 378, and a simultaneous coincidence between the counts of the data entry line address counter 382 and the memory line position counter 385, as shown in FIG. 16. The Coincidence pulse thus occurs at the active or data entry position, at which the last data was stored in the memory shift registers 256–259 in response to input data. If there is no stored data corresponding to the data entry line, for example, the backspace key has been depressed to remove all data in this line or the carriage return key has been depressed to shift the display of the data entry line to another line, the Coincidence pulses will occur during the time from the 80 Character Reset signal of a preceding scan line to the Left Margin signal of the next scan line. This occurrence of the Coincidence pulses, of course, results in the fact that the data entry character address counter 380 has been stepped down so that no count is stored therein, and the memory character position counter 378 is reset upon the occurrence of the 80 Character Reset signal. This relationship is shown in FIG. 20a, which indicates the scan line pulse occurring at the end of one scan line, between the 80 Character Reset signal and the Left Margin pulse of the next scan line, the Left Margin pulse being indicated in FIG. 20b. FIG. 20a also indicates that the horizontal retrace on the display device occurs in a determined time duration following the End Scan Line pulse. If data is stored at only one bit in a recirculating shift register 256—259 corresponding to the data entry line, the date entry position will be at the end of the first character space in the data entry line, and hence the coincidence pulse in such a situation occurs at the end of the Left Margin pulse, as illustrated in FIG. 20c. (It is to be noted that the coincidence pulses have widths corresponding to the widths of the Decoder Clock pulses.) If the data entry position is now moved backward one character, the coincidence pulse will be comprised of a continuous pulse extending from the 80 Character Reset of the preceding scan line to the Left Margin pulse of the scan line of interest, as illustrated in FIG. 20d. In this case it is to be noted that an End Scan Line pulse occurs during the time of the Coincidence pulse. The simultaneous occurrence of these two pulses thus provides an indication that the recirculating shift register 256-259 corresponding to the data entry line is empty and, hence, that no further backspace operations can occur in the data entry line. The simultaneous occurrence of these pulses may be referred to as a "zero load point."

In accordance with a feature of the invention, as previously discussed, if a backspace operation cannot continue in the data entry line, the other lines of the display may be automatically shifted downwardly, whereby the backspace operation can be effective with respect to displayed data previously shifted from the data entry line and now returned to the data entry line.

Referring again to FIG. 18, the D type edge-triggered flip flop 450 constitutes a zero load point detector, and provides an output at its Q terminal if there is a coincidence between an End Scan Line pulse and a Coincidence pulse. This is illustrated in FIG. 21, wherein FIG. 21a depicts various End of Scan Line pulses; FIG. 21b depicts a sequence of Coincidence pulses coincident with the End of Scan Line pulses in the data entry line scan lines; and FIG. 21c illustrates the Q output of flip flop 450. It is to be noted that the output of flip flop 450 ceases on the next End of Scan Line pulse following the last Coincidence pulse of the data entry line. If, in response to depression of the backspace key, the level at the output of flip flop 410 is changed, as illustrated in FIG. 21a, and the level at the D terminal of the flip flop 451 is therefore changed. The flop flop 451 is clocked by the output of the zero load point detector 450, to reverse the levels at the input of JK flip flop 452. It is to be noted that the Q output of flip flop 450 and the output of flip flop 410 are also applied to a NAND gate 453, with the output of this NAND gate being applied to a reset terminal of the flip flop 402, thereby inhibiting the production of the T2 signal and the T3 signal. Since the T2 signal is inhibited, the backspace flip flop 411 is not clocked, and hence a Character Countdown pulse for the data entry character address counter 380 of FIG. 16 is not generated. In the absence of the T3 signal the flip flop 410 will not be reset by the above described mode (the flip flop 411 in this case has not been set, and hence need not be reset), but this is immaterial, since if the next key depressed is not a backspace key, the flip flop 410 will then be reset, and if the next key depressed is a backspace key, there is no need to reset the flip flop 410.

The Q output of the flip flop 451 is illustrated in FIG. 21e, and this flip flop prepares the flip flop 452 whereupon, upon the next Line Count pulse, as illustrated in FIG. 21f, the flip flop 452 is clocked to provide an output as illustrated in FIG. 21g.

The $\overline{Q}$ output of the flip flop 452 resets the flip flop 451 and hence the next following Line Count pulse again clocks the flip flop 452, whereby the output of the flip flop 452 only occurs for a period between two succeeding line count pulses, as illustrated in FIG. 21g. It is to be noted that the Line Count pulses during which the output of flip flop 452 occurs are the Line Count pulse corresponding to the first and second lines of the display.

The $\overline{Q}$ output of the flip flop 452 is applied as a second input to the AND gate 428, and hence, during the occurrence of the output of the flip flop 452 as discussed above, Line Count pulses cannot be passed by the AND gate 428 to produce the Line Position Count signal, and hence one Line Position Count signal is omitted, as seen in FIG. 21h. As a result, one count is skipped in the memory line position counter of FIG. 16. This effects the reassignment of the recirculating shift registers 256-259 of FIG. 10 to the display lines and hence all lines of the display are shifted downwardly one line, by the omission of the one Line Count pulse. The former data entry line is thus shifted to the top line of the display, and since there is no stored data corresponding to this line, there is no need to erase data from the recirculating shift register 256-259 now corresponding to the top line of the display.

Prior to the roll down of the display data, the data entry position of the data entry line was positioned at O. Following the shifting of the display downward, it is apparent that the data entry position will no longer correspond to the data now in the data entry line. In order to correct this, so that the data entry position is properly oriented for further operations with respect to data now corresponding to the data entry line, the $\bar{Q}$ output of the flip flop 452 is also applied to the set input of RS flip flop 454. As a consequence, this flip flop is set, as illustrated in FIG. 21*i*. The flip flop 454 is reset at the occurrence of the next scan line 80 pulse. The output of the flip flop 454 is applied to one input of the AND gate 455, and the memory CR pulse is applied to the other input of this AND gate, so that the output of the AND gate 455 is a load seven bit data signal. An output from the AND gate 455 will thus occur at each occurrence of the Memory CR pulse during the set state of the flip flop 454, as illustrated in FIG. 21*j*.

As shown in FIG. 21*h*, it was the Line Count pulse corresponding to the second line that was omitted, to effect the roll down of displayed information. Consequently, a Memory CR pulse will occur corresponding to the first displayed line. Since the data is subsequently shifted downwardly, a Memory CR pulse will also occur at each of the following three lines, including the data entry line, and the last pulse of the Load Seven Bit Data signal illustrated in FIG. 21*j* thus corresponds to the Memory CR pulse of the data now displayed in the data entry line. The time of occurrence of this pulse thus provides an indication of the print point of the information in the data entry line. The load seven bit data pulse, referring to FIG. 16, is applied to the data entry character address counter 380, and since this pulse occurs at the time that the count in the memory character position counter 378 corresponds to the stored CR pulse corresponding to data displayed in the data entry line, this count is set into the data entry character address counter 380. As a consequence, it is apparent that the following Coincidence pulses will occur at the proper time with respect to the data now displayed in the data entry line.

While, referring to FIG. 21*j*, three previous Load Seven Bit Data pulses had occurred, resulting in three previous settings of the data entry character address counter 380 of FIG. 16, this is not material, since the final count stored in the data entry character address counter 380 is correct.

The $\bar{Q}$ output of the flip flop 452 also provides a NO count signal, for a purpose that will be discussed in greater detail in the following paragraphs.

FIG. 18 further illustrates the application of a Platen Roll Down signal to the set terminal of the flip flop 451. This signal, which may be derived from a separate key on the keyboard for the purpose of enabling the roll down of the data, sets the flip flop 451 directly, to effect the roll down of the display in the above described manner. Since the roll down is not in response to a Function Strobe signal and a backspace signal, the data entry sequencing of the circuit is not necessary, and hence the T2 and T3 signals are not produced, nor is the flip flop 410 set.

In this case, the bottom line is shifted to the top line without erasure. As a consequence, it is possible by this technique to selectively position any of the character lines of the display at the data entry or fourth line. This feature may be useful, for example, to enable an operator to make a correction in a line that had been previously rolled up or to add further characters to such a line. Following such correction, the desired line may be repositioned at the data entry line for normal continuation of the entry of data. In order to avoid confusion of operators more familiar with a knob at the end of a platen which may be rotated to change the position of typed lines, a rotatable knob may be provided on the side of the apparatus of FIG. 1, either alternatively to or in addition to a platen roll down key, this knob being mounted to operate a switch or the like for producing a Platen Roll Down pulse upon incremental rotation thereof by the operator. For example, such a knob may be provided with circumferentially spaced projections positioned to sequentially engage a switch, the switch being connected by conventional means to produce the Platen Roll Down pulses.

JUSTIFICATION

As is well known, the process of justification of a line of characters involves readjustment of the characters in the line in some manner, whereby a fixed orientation of a determined character results. Usually, justification entails the expansion of the line, so that the first and last displayed characters of a line appear at determined left and right margins, respectively.

The justification arrangement, in accordance with the invention, will achieve this objective, and is also readily adaptable to other functions, such as the centering of characters between the margins, and the movement of the characters, without changes in the lengths of space, to the right-hand margin.

In order to achieve these objectives, in accordance with the invention, justification is effected by counting the number of word spaces, i.e., spaces between displayed characters in the lines. If the line is extended into a justification region, adjacent the right margin, for example, by extension of the actual characters into this region, or by spacing a print point indication into this region, a justification of the line can result. It will be understood that the term "print point," as used herein, is synonymous with the terms "active position" and "data entry position," the former term being more descriptive when referring to a printing apparatus and the latter terms being more generically descriptive of printed, optically generated and electronically generated displays. In the justification process, if no displayed character appears at the right margin, and additional unit space is added to the first word space in the line. If this does not result in justification of the line, a single unit space is then added to the second word space in the line. This process is repeated until the last character in the line appears at the right margin. If justification has not occurred when a single unit space has been added to each word space, then the process is repeated until justification, in fact, occurs.

In order to enable centering and moving of text to the right margin, as above discussed, the keyboard is provided with a space key, which may be called a fixed-space key, having a code which differs from the code of the conventional word space key. The code of the fixed-space key is handled as though it represented a character, at least with respect to the justification process, even though no character is displayed in response to depression of the key.

In order to justify a displayed line, in accordance with the above technique, it is thus necessary to provide means for counting and storing the actual number of word spaces in a line, as well as to provide means for indicating the location of a word space at which a unit space was last added in order to effect justification.

For this purpose, referring to FIG. 22, a four bit counter 500 is connected to receive and count the End of Word Space pulses in each scan line. The four bit counter 500 is reset to a count of zero at the end of each scan line, by the application thereto of the End Scan Line pulses. The coded output of the counter 500 is applied to a comparator 501 and a latch 502. The latch 502 may be comprised, for example, of a type SN7475 quad bistable latch. The selction of a four bit counter, which can store up to a count of sixteen, is arbitrary, and a counter of a different capacity may alternatively be employed, depending upon the maximum number of expected word spaces in a line.

The latch 502 is employed to store the number of word spaces in the line to be justified, i.e., the top line of the display, corresponding to scan lines 17-32.

Once the required data for justifying a line has been stored, it is not necessary to modify this data until a new display line is to be justified. This occurs when a carriage return key is depressed corresponding to the data entry line, which, as above discussed, results in the upward shifting of the lines on the display. It is thus necessary to load the latch 502 only in the top scan line 17 of the top line of the display following the depression of the carriage return key. For this purpose, a Clear Space Bit information pulse is produced, by means which will be discussed in greater detail in the following paragraphs, occurring during scan line 17 following the generation of a CR complete signal in response to the depression of a carriage return key. The Clear Space Bit information pulse and the Scan Lines 17-32 pulse, are applied to an NAND gate 503, to clock a D type edge-triggered flip flop 504, the D terminal of this flip flop being connected to a fixed potential. As a consequence, the $\bar{Q}$ output of flip flop 504 enables an AND gate 505 in scan line 17, whereby a load signal from the output of the AND gate 505 is applied to the latch 502 in response to each End of Character pulse, since the end of character pulses are applied to the other input of the AND gate 505. As a consequence, in the seventeenth scan line of a scan following the completion of a carriage-return operation, the count of the four bit counter 500 is transferred to the latch 502 at the occurrence of each End of Character pulse. This loading continues until the occurrence of a Memory CR pulse in line 17, the Memory CR pulse resetting the flip flop 504, and hence blocking the AND gate 505. As a consequence, it is apparent that the count stored in the latch 502 corresponds to the number of word spaces in the top line of the display, which are followed by a character, and that this count is retained until a carriage-return key is again depressed for the further shifting of display lines. Thus, although the four bit counter 500 will be still counting the number of word spaces in each scan line, subsequent counts will not be stored in the latch 502 until a shift of the display is again effected.

The coincidence output of the comparator 501 is applied, by way of AND gate 506, to step the input of a four bit counter 507. The End of Word Space signal, the $\bar{Q}$ output of a D type edge-triggered flip flop 510, and an "Okay to Justify" signal, which will be discussed in greater detail in the following paragraphs, enable the AND gate 506. The output of the AND gate 506 also constitutes a Space Bit signal for indicating the position at which word spaces to be stretched are located. The Space Bit signal is applied to the C terminal of the flip flop 510, and the D input of this flip flop is connected to a positive reference. The Memory Active signal is connected to reset the flip flop 510. As a consequence, the Q output of the flip flop 510 disables the AND gate 506 upon the occurrence of a Space Bit in a scan line, whereby only a single Space Bit may occur in any scan line, i.e., until the flip flop 510 has been reset in the next scan line by the Memory Active signal. The Q output of the flip flop 510 constitutes a Stretch Enable signal.

The four outputs of the four bit counter 507 are applied to the comparator 501, for comparison with the count of the four bit counter 500. In addition, the outputs of the four bit counter 507 and the latch 502 are applied to a comparator 508. The coincidence output of the comparator 508 is applied, by way of inventer 509, to set the four bit counter 507 to a count of one.

In the operation of the circuit of FIG. 22, assume that initially the four bit counter 507 is set to a count of one. Then, as soon as the first word space is counted in the counter 500, a comparison will be detected in the comparator 501, resulting in the stepping of the four bit counter 507 to a count of two due to the application of a space bit thereto from AND gate 506. The stepping of the 4 bit counter 500 will continue for the rest of the scan but no further Space Bit will be generated during this scan line due to the disabling of the AND gate 506 by the flip flop 510 upon the first occurrence in the scan line of a Space Bit. In succeeding scan lines, single Space Bits will be generated in a corresponding fashion. The Space Bits thus sequentially locate, in successive scan lines, the positions of the word spaces in the memory shift register 256-259 corresponding to the top line of the display. The 4 bit counter 507 is thus stepped at each generation of a Space Bit, upon the detection of coincidence in the comparator 501.

If, at any time, the count in the counter 507 reaches the count in the latch 502, a coincidence pulse will be produced in the comparator 508 to reset the counter 507. This process continues only during the scan lines 17-32, since, as will be explained in greater detail in the following paragraphs, the "Okay to Justify" signal only occurs during these scan lines. The 4 bit counter 500 is reset at each End Scan Line pulse, so that the instantaneous count in the counter 500 corresponds to the number of the detected word space in that scan line. Otherwise, successive Space Bits may not correspond to successive word spaces of the line to be justified.

The generation of control signals for the justification circuit is illustrated in the circuit of FIG. 23. As discussed above, with reference to FIG. 22, a Clear Space Bit Information signal must be provided occurring only during the first scan line 17 following the depression of the carriage return key. For this purpose, referring to FIG. 23, the Carriage Return Complete signal is applied to the C input of the D type edge-triggered flip flop 550, the D input of this flip flop being connected to a positive reference. A Scans 18-32 signal occurring only during scan lines 18-32 resets the flip flop 550. The Scans 18-32 signal is derived from the Q output of a D type edge-triggered flip flop 551, and will be discussed in greater detail in the following paragraphs. The signal at the Q output of flip flop 550 thus appears only during the next scan line 17 following a CR complete signal responsive to the depression of the carriage return key, and hence this output of the flip flop 550 constitutes the Clear Space Bit Information signal which enables loading of the latch 502 of FIG. 22 only during the first scan line 17 following a carriage return sequence.

The process of justification occurs only during scan lines 17-32, corresponding to the top line of the display, and justification only occurs in these scan lines if data is present corresponding to the top line of the display. With these conditions in mind, referring to FIG. 23, the Scan Lines 17-32 signal is applied as an enabling signal to the D input of a D type edge-triggered flip flop 552, and the memory CR signal indicating the presence of data, is applied to the C terminal of this flip flop. The flip flop 552 is reset by the Scan Line 80 pulse. As a consequence, the Q output of flip flop 552 wil be active during any scan in which a Memory CR pulse occurs in the top line. The Q output of the flip flop 552 enables a D type edge-triggered flip flop 553, the Clear Space Bit Information pulse being applied to the C terminal of this flip flop. As a consequence, the flip flop 553 is set by the Clear Space Bit information pulse if a Memory CR pulse appears in the first scan line 17 following a carriage return sequence. The Q output of the flip flop 553 constitutes the OK to Justify signal. The flip flop 553, which changes state only in response to positive transitions at the C input, thus maintains the OK to Justify signal active following the termination of the Clear Space Bit Information pulse. The OK to Justify signal enables the passing of Space Bits to the 4 bit counter 507 of FIG. 22 so that, as will be discussed in greater detail in the following paragraphs, the necessary stretching of pulses for a justification operation may continue.

As a necessary condition of justification, the data entered in a line must have proceeded into the justification area. This condition can be ascertained by a coincidence between a Memory CR signal and the Justified Area signal from the output flip flop 210 of FIG. 9. Referring again to FIG. 23, the Memory CR signal is applied by way of an inverter 554 to one input of AND gate 555, and the Justify Area signal is applied as the other input of the AND gate 555. The output of the AND gate 555 is applied by way of OR gate 556 to one input of NAND gate 557. (The Justify Area signal enables gate 555 at all times except during the time corresponding to the justify area. As a consequence, the occurrence of the memory CR signal any time outside of the justify area results in a pulse at the output of AND gate 555, to result in the production of a Stop Justification signal.) The Scan Lines 17-32 signal is applied to the other input of the NAND gate 557, and the output of this NAND gate is applied to the reset terminal of the flip flop 553. The output of the OR gate 556 consitutes a Stop Justification signal, indicating that justification should not proceed. Thus, this signal is produced if there is no coincidence between the Memory CR and Justification Area signals, and if this condition occurs during the Scan Lines 17-32, the flip flop 553 is reset and the OK to Justify signal is inhibited. In this case, the justification circuits are disabled initially in response to the depression of a carriage return key so that no justification occurs in the top line of the display. It is to be noted that it is not necessary for characters of the display to extend into the justification area, in order for a justification sequence to occur, but only that the Memory Carriage Return signal occur in this area. Thus, if a justification sequence is desired in those cases where characters do not extend into justification area, the operator may space the data entry position of the line into the justification area, before depressing the carriage return key.

Once a character (or fixed space appears at the right margin, the justification process is complete, and hence the production of further space bits indicating word spaces to be expanded, must be inhibited. For this purpose a Stop Justification signal is produced in response to coincidence between the Right Margin signal and an End Character signal. Thus, as shown in FIG. 23, the Right Margin signal is applied as one input to an AND gate 558, and the End Character signal is applied to the other input of the AND gate 558 by way of a negated input of an AND gate 559. The output of the AND gate 558 is applied, as a second input, to the OR gate 556, whereby a Stop Justification signal occurs at the output of the OR gate 556. This results in the disabling of the OK to Justify signal, in the manner above discussed.

It is to be noted that the Clear Space Bit information signal is derived from the $\overline{Q}$ output of flip flop 550, and as a consequence the positive transition of this signal occurs at the end of the scan line 17. As a result, the OK to Justify signal first occurs on scan line 18 following the termination of the Clear Space Bit information signal. This enables further functions of the Clear Space Bit Information signal to be effected, such as the clearing of data, to occur prior to a new justification process.

In order to prepare the latch 502 and the 4 bit counter 507 for a new justification process, the Clear Space Bit information signal is applied to reset these components.

The Character Space Data signal is applied to the other input to the AND gate 559. This signal is derived from the gate 336 of FIG. 13.

For further use in the justification system in accordance with the invention, a Spacing Clock signal is generated, of a determined number of clock pulses of constant repetition rate synchronized with the Unit Space Clock, starting at the left margin. The number of pulses of each Spacing Clock group is dependant, for example, on the number of characters that may be displayed in a display line. In the present example, which has been described with reference to a possibility of 80 characters in a display line, a determined number of 320 spacing clock pulses has been selected for each Spacing Clock group. It is apparent that the number of pulses selected for the group must be sufficient that each position of the line be accurately definable. For this purpose, referring to FIG. 23, a 320 bit shift register 575 is provided. The left margin count pulse is entered into the first stage of shift register 575, and the shift register 575 is clocked by the Unit Space clock which is applied thereto by way of 3 input NAND gate 576. The NAND gate is enabled by the Scan Lines 17-32 signal, and by the Memory Active signal which is applied thereto by way of an inverter 577 and a NAND gate 578. The output, i.e., the last stage, of the shift register 525 is applied to the second input of the NAND gate 578.

In this circuit, it is apparent that the Left Margin Count pulses, at the left margins of each of the scan lines 17-32, are stepped through the 320 bit shift register at the Unit Space Clock rate. As soon as the stepped pulse reaches the end of the shift register 320, it disables the NAND gate 576 to inhibit the application of further Unit Space Clock signals to the 320 bit shift register. Thus, the Spacing Clock output of the NAND gate 576 is a series of clock pulses at the Unit Space Clock rate, starting at the left margin of each of the scan lines 17-32.

As above discussed, a Scan Line 18-32 signal was produced by the flip flop 551, in order to select the 17th scan line for the Clear Space Bit Information signal. For this purpose, the Scan Lines 17-32 pulses are applied to the D terminal of the flip flop 551 and the output of the 320 base shift register 575 is applied to the C terminal of this flip flop. The flip flop 551 is thus enabled at the start of the 17th scan line, in response to the shifting of the pulse 320 bit shift register. Thus, no pulse appears corresponding to the Scan Line 17 pulse. The Scan Lines 17-32 pulses are also applied to the reset terminal of the flip flop 551, so that a pulse appears at the output of the flip flop 551 corresponding to each of the lines 18-32.

When the arrangement in accordance with the invention is employed in combination with a printer, the generation of several additional signals may be necessary. For example, it may be undesirable to load the printer with data when the justification information is being generated. For this purpose, the Q̄ output of the flip flop 553, i.e., the inverted OK to Justify signal, it applied to the C terminal of a D type edge triggered flip flop 580, the Q̄ output of this flip flop being applied by way of one negated input of AND gate 581 to the enabled D input of D type edge triggered flip flop 582. A Gate Print signal, obtained from the Q̄ output of flip flop 551 is applied to the C input of flip flop 582. As a consequence, a Load Printer signal, indicating that data in justified form is ready to be loaded into a printer, is produced at the Q̄ output of the flip flop 582. The flip flop 582 is reset by the Scan Lines 17-32 signal and the flip flop 580 is reset by the Q̄ output of the flip flop 582. The printer busy signal, previously discussed, is derived from the Q output of the flip flop 580. In the initiallizing operation, the clear 1 signal is applied to enable terminal of flip flop 580 and to set the flip flop 550. An Interlock signal, which may be obtained from a printer, is applied to the other input of the end gate 581.

In the circuit of FIG. 23, the flip flops 550, 551, 552 and 553 may be type SN 7474.

FIG. 24 illustrates several of the signals of the circuit of FIG. 23. Thus, upon generation of a CR complete signal, as shown in line a, the Clear Space Bit Information signal, shown in line b, is initiated. The Clear Space Bit Information signal is reset by the Scan Lines 18-32 signal, shown in line d. A Memory CR signal indicating that data is present in line 17, as shown line e, appears between the leading edges of the scan lines 17-32 pulses and of scan lines 18-32 pulses, shown in lines c and d respectively. The flip-flop 553 is enabled by the Q output of flip flop 552, as shown in line f, whereby the OK to Justify signal may be produced upon the termination of the Clear Space Bit Information signal, as shown in line g.

FIG. 25 illustrates the circuit for storing the positions of the word spaces, and for expanding the word spaces as necessary in order to effect justification. This circuit is comprised of a 320 bit shift register 600, i.e., a shift register having the same number of bits as the number of Spacing Clock pulses for each scan line. The Space Bit signals are applied to the input stage of the shift register 600 by way of an OR gate 601, and the shift register 600 is clocked by the Spacing Clock. The shift register 600 is connected to recirculate bits stored therein by way of a path including NAND gate 602, OR gate 603 with inverted inputs, three input NAND gate 604, and the OR gate 601. Thus, if no expansion of the word spaces is required, the data in the shift register 600 will be recirculated at the Spacing Clock rate by the above path.

As discussed above, once the number of Space Bits has reached the count stored in the latch 502 in FIG. 22, the four-bit counter 507 will be reset, whereby the Space Bits successively correspond to the word spaces in the line, so that the positions of the word spaces are sequentially indicated. In the process of justification, it is necessary to insert an additional unit space at each such indicated word space, as determined by the occurrence of the Space Bit.

If a Space Bit occurs at a position at which a previous bit has been stored in the shift register 600, then it will be necessary to insert an additional unit space in the shift register 600 to increase the effective length of the word space. This condition is determined by the existence of a bit output from the shift register 600, returned to the input thereof, which coincides with an incoming Space Bit.

The arrangement for so increasing the width of a word space will be more clearly understood by reference to FIG. 25, which shows the circuit, and FIG. 26, which shows various time diagrams for the circuit. Thus, FIG. 26a depicts a portion of the Spacing Clock sequence in a scan line. FIG. 26b depicts a Space Bit received by the 320 bit shift register, and FIG. 26c depicts an output of the shift register 600, assuming for the sake of example, that the word space previously stored had a width of four unit spaces. The output of the shift register 600 is applied to the J input of a JK flip flop 605 clocked with the spacing clock and hence, as illustrated in FIG. 26d, the Q output of the flip flop 605 will be a pulse of the same width as the pulse output of the shift register 600, but delayed in time by one unit space.

Referring to FIG. 22, the Space Bit is also applied to the clocking terminal of a D-type flip flop 510. Flip flop 510 is actuated by the space bit, as indicated in FIG. 26e, and comprises the stretch enable signal.

Referring again to FIG. 25, an inverter 608 is connected to the output of the shift register 600, this inverter thereby having an inverted output as illustrated in FIG. 26f. The output of the inverter 608, the Q output of flip flop 605 and the Stretch Enable pulse are applied by way of input NAND gate 607 and inverter 609 to the clocking terminal of a D-type flip flop 610. The D terminal of this flip flop is connected to a reference potential. The clock signal for this flip flop as illustrated in FIG. 26g, has a positive transition at the time of the negative transition of the output of shift register 600, and hence, the Q output of this flip flop, as indicated in FIG. 26h, also has a positive transition at this time. The Q̄ output of flip flop 610 is illustrated in FIG. 26i. The Q̄ output of flip flop 610 is applied to the NAND gate 611, whereby this NAND gate has an output, as illustrated in FIG. 26j, corresponding in this case to the inverse of the output of shift register 600. The Q̄ outputs of flip-flops 605 and 610 are applied to NAND gate 611 to provide an output as illustrated in FIG. 26k. It is apparent that the output of this NAND gate 611 is a negative going pulse having a width of one unit space and occurring immediately following the pulse output of NAND gate 602. The outputs of the gates 602 and 611 are applied to the inputs of the OR gate 603, to provide an output therefrom as illustrated in FIG. 26l, which corresponds to the output of shift register 600, but is stretched one additional unit space. This extended width pulse is recirculated to the input of the shift register 600, as discussed above, for storage therein.

It is apparent that, by the same process as above discussed, upon the occurrence of any Space Bit coinciding with a pulse stored in the shift register 600, the storage pulse will be increased in width by one unit space. The circuit of FIG. 25 is reset following the Scan Line 80 pulse, by the application of the Memory Active signal to the flip-flop 610, whereby the circuit may again receive a space bit for the expansion of the next word space therein. Since the flip-flop 510 of FIG. 22 is not reset until the end of the scan line, only one expansion operation can occur in any given scan line.

The output of the 320 bit shift register 600 is applied to an AND gate 612, the other input of this AND gate being the OK to Justify signal. Therefore, during a justification period a Justification Control output from the AND gate 612 is applied to the enabling D terminal of the flip-flop 298 previously discussed with reference to FIG. 11. In the previous discussion of the flip-flop 298, it was assumed that the flip-flop was continuously enabled to pass the Unit Space clocks to form the Logic Clock signal. Upon the occurrence of a Justification Control signal, however, the flip-flop 298 is disabled, thereby blocking passage of the Unit Space Clock through the flip-flop 298. As a consequence, the production of End of Word Space signal in the circuit of FIG. 11 is delayed, to expand the word spaces. Since the expanded pulses stored in the shift register 600 are stored until the next impression of a carriage - return key, these bits serve to expand the word spaces in the justified lines of the display continuously, so that a fully justified line of characters is continually displayed in the first line of the display.

During any given cycle of the shift register 600, in response to the application thereto of 320 space clock pulses, it is apparent that the output of the shift register 600 corresponds to 320 unit spaces sequentially following the left margin of the display. As a consequence, it is apparent that expansion of a given word space would, without any further precautions, reduce the space between the extended word space and the next following word space. In other words, it would result in the incorrect location of the bits stored in the shift register 600 following a just-expanded pulse. In order to avoid this, the normal recirculation path of the output of the shift register, by way of NAND gate 602, is blocked by the $\overline{Q}$ output of the flip-flop 610 following the expansion of a word space, until the end of the related scan line, and the next following bits are thus recirculated by way of the flip-flop 605, NAND gate 611, OR gate 603, AND gate 604 and OR gate 601. From FIGS. 26c and 26d, it is apparent that the output of the flip-flop 605 corresponds to the output of the shift register 600, but is delayed by one unit pulse. As a consequence, this latter recirculation path for the next following bits effects the reinsertion of the next following bits at positions delayed by one unit space, so that such next following bits are now stored in the correct positions following a stretching operation.

In order to clear the 320 bit shift register 600 when the display is shifted upwardly, and a new line of characters is presented for display in the top line thereof, the gate 604 is blocked by the Clear Space Bit Information signal. As a consequence, the output of the shift register 600 is prevented from being recirculated to the input, and the shift register 600 is thus completely emptied of its contents during the 17th scan line following the CR Complete signal.

The typographic apparatus in accordance with this invention is also adaptable to TAB control, as illustrated in FIG. 27. For this purpose, a shift register 625 is provided for storing the TAB stops. The shift register 625 is shifted in synchronism with the Unit Space Clock, and this register has a number of bits equal to the number of Unit Space Clock pulses in a scan line and word space. The output of the shift register is circulated to the input by way of NAND gate 626 and OR gate 627, so that pulses at the output of the shift register 625 continually correspond in time to determined TAB stop positions on the display. The Unit Space Clock is applied to the shift register 625 by way of an inverter 628, for stepping the shift register.

Memory Tab signals from the Tab decoder 277 of FIG. 10 are applied to the C terminal of a D type edge triggered flip flop 629, the enable terminal of this flip flop being connected to a reference potential. The flip flop 629 is reset by the Tab Stop pulses at the output of the shift register 625. The $\overline{Q}$ output of the flip flop 629 is applied to the enable terminal of the flip flop 298, which was discussed previously with respect to FIGS. 12 and 25. The Memory Tab signals occur whenever a coded signal corresponding to a stored Tab signal appears at the output of the multiplexer 260 of FIG. 10.

As discussed previously with reference to justification, the flip flop 298 is connected to delay the logic clock, and hence to delay the Character Clock, so that word spaces may be stretched at the determined locations. The TAB control circuit operates in the same manner to delay the Character Clock, and hence provide a space without characters on the display screen. For example, if a Memory Tab signal occurs at the output of the multiplexer 260 of FIG. 10, during the scanning of any line, this Memory Tab signal sets the flip flop 629 of FIG. 27, thereby disabling the flip flop 298 and preventing generation of the Character Clock. Since the display device continues to be scanned, no characters will appear until a time at which a Tab Stop pulse output from the shift register 625 resets the flip flop 629. Since the time positions of the pulses of the shift register 625 correspond to determined display positions, it is apparent that once a Memory Tab signal has been detected, no further characters will be displayed in the display line until the next Tab Stop position is reached in the scan of the line.

Thus, in accordance with the invention, the location of instructions for tabbing is stored in the recirculating shift registers 256–259 of FIG. 10, but the location of the Tab stop positions is stored in the shift register 625. The actual position of the TAB stops may be changed, by changing the relative time positions of pulses stored in the shift register 625, independently of data stored in the memory shift registers 256–259 of FIG. 10.

FIG. 27 further illustrates circuits which may be employed for inserting Tab Stop pulses in the shift register 625, and for clearing previously set TAB stops. It is first to be noted that the Right Margin signal is continually applied to another input of the OR gate 627, so that a TAB stop will always appear at the right margin.

In order to be able to set a TAB stop at a determinable position, it is of course necessary to be able to corrolate the desired position on the screen with the instant at which that position is being scanned. This is possible in the data entry line, since the Coincidence pulses occur at times related to the scanning procedure, and means which will be discussed in greater detail in the following paragraphs, may be provided for indicating the position on the screen at time of the Coincidence pulses. As illustrated in FIG. 27 the Coincidence pulses are applied to the C terminal of a D type edge triggered flip flop 630, this flip flop being enabled by a fixed potential. The Q output of flip flop 630 sets a D type edge triggered flip flop 631 clocked by the Unit Space Clock, so that pulses corresponding to the Coincidence pulse and synchronized with Unit Space clock are provided at the $\overline{Q}$ output of the flip flop 631. The enable terminal D of this flip flop is connected to ground reference. The $\overline{Q}$ output of flip flop 631 is applied by way of inverter 632 to one input of NAND gate 633, the other input thereof being connected by way of a TAB set switch 634 to a reference potential. The output of the NAND gate 633 is applied to a further input to the OR gate 627. The TAB set switch 634 corresponds to the TAB set switch on the keyboard, illustrated in FIG. 2 although it will be understood that the switch 634 may be electronic switch or a source of Tab Set pulses responsive to operation of the TAB set switch of FIG. 2.

Referring again to FIG. 27, it is apparent that a Tab Set pulse synchronized with the Coincidence pulse will be set in the shift register 625, in response to depression of the Tab Set key. While this setting operation occurs during the data entry line, in the above described arrangement, it is apparent that this is only a matter of convenience in view of the existence of Coincidence pulses which may be readily employed in the setting of tab stops and the shift register 625.

The clearing of a tab stop in the shift register 625 is affected by depression of the Tab Clear switch of FIG. 2. This switch effects the application of a potential to the clear terminal of a flip flop 635 of FIG. 27, by way of a switch 636 which may be of the same nature as the Tab set switch 634. The D type edge triggered flip flop 635 is enabled by a fixed potential, thus acting like a latch, storing the TAB Clear function which can occur at random times. The Q output of this flip flop is applied to the enable terminal of a further D type edge triggered flip flop 636. The flip flop 636 is clocked by the output of the inverter 632, whereby the output of flip flop 636 flips in synchronism with a Coincidence pulse following the setting of flip flop 635. The $\overline{Q}$ output of flip flop 636 resets the flip flop 635, to enable the circuit for further Tab clear operations.

Two methods are available for clearing tab stop locations. The first method to be discussed in the paragraphs to follow requires that the print point or data entry point as observed on the display, be coincident with a previously entered tab stop. In the second method to be discussed, the operator simply depresses the tab key of FIG. 2 which will automatically position the data entry point and hence the coincidence pulse to the desired position in relation to the tab stop to be cleared.

It will be recalled that the Coincidence pulses actually occur at the location of the next previously entered data, and hence a Tab Stop pulse to be deleted occurs after the next following Decoder pulse. It is thus necessary to delay clearing of the shift register 625 until the next following decoder pulse. For this purpose, the outputs of the flip flop 636 are connected in cascade to the J and K inputs of a JK flip flop 637 clocked by the Decoder clock. The $\overline{Q}$ output of the flip flop 637 resets the flip flop 636, and the Q output of flip flop 637 is applied by way of AND gate 638 and OR gate 639 to the second input of NAND gate 626, whereby a Stop pulse appearing at the time of the Decoder clock following the Coincidence pulse is inhibited from recirculating through the NAND gate 626, and this pulse is deleted from the shift register 625.

FIG. 28 illustrates the above described operation of the tab control system so far described. Thus, line a of this figure shows unit space clock as applied to the clock input of flip flop 631 and reset input of flip flop 630. Line b illustrates a coincidence pulse derived from the comparator 376 of FIG. 16, a four unit character width pulse is shown for clarity. Lines c and d depict the outputs of flip flops 630 and 631 respectively, showing a timing pulse derived from the coincidence pulse of line b. Activating the tab clear function 636 sets flip flop 635 at some random time depicted by line e, allowing the next timing pulse, line d, to clock flip flop 636 to its set state as shown in line f. Flip flop 636 having been set then clears flip flop 635. Decoder clocks, shown in line g, along with the now active flip flop 636, causes the setting of flip flop 637, see line k of FIG. 28, to provide a signal through AND gate 638 and OR gate 639 to block the passage of a tab stop signal through NAND gate 626 and hence delete the tab stop from the shift register memory system 625 described above.

In the above described portion of this circuit, it was assumed that the other input of the AND gate 638 was at a logic upper level. This input is connected to the $\overline{Q}$ outputs of the D type edge triggered flip flop 640, and it was assumed that the data entry position was not set in response to the depression of a Tab key on the keyboard. If the Tab key has been depressed, for example in order to move the data entry position to the position of the next Tab Stop, this will result in the storage in the memory shift register corresponding to the data entry line of a coded Tab Signal, and the stepping of the data entry position. As a consequence, the Coincidence pulse will be timed properly to effect the deletion of the stop bit from the shift register 625. The coded Tab Signal thus provided by the decoder 254 of FIG. 10, in response to the depression of the Tab button on the keyboard, is applied by way of inverter 641 to one input of NAND gate 642. This signal is stabilized by the Function Strobe signal, which is applied to the other input of the NAND gate 642, and the output of this NAND gate enables the flip flop 640. The flip flop 640 is clocked by the Delayed Data Strobe signal, whereby the $\overline{Q}$ output of this flip flop clocks the AND gate 638 and the Q output of the flip flop 640 enables AND gate 643. The Q output of flip flop 636, which now occurs at the correct time in relation to the position of the tab stop information in shift register 625 is connected to the other input of the AND gate 643 and the output of AND gate 643 is connected by way of the OR gate 639 to block the NAND gate 626, and thus deletes the tab stop information as described in detail above.

It is thus apparent that, with this arrangement, the recirculating path of a shift register 625 is blocked at the proper time to clear the desired Tab stop from the shift register 625.

VIDEO MARKERS

As previously discussed, it is desirable to provide markers on the display for indicating the position of the justification area and the right margin. For this purpose, referring to FIG. 29, the $2^6$ output of the scan line counter 212 of FIG. 9 and the start justification area signal from comparator 205 designated in the circuit of FIG. 9 are applied to separate inputs of NAND gate 650. The $2^6$ signal only occurs in the fourth line of the display, becoming active on the 64th scan line, and the justification area signal occurs at the beginning of the justification area, the output of the NAND gate 650 will be active during all scan lines of the fourth line at the beginning of the justification area.

The right margin signal and the $2^6$ of the scan line are applied to separate inputs of NAND gate 651, whereby the output of the NAND gate 651 marks all scan lines of the fourth display line at the right margin. The NAND gates 650 and 651 are of the "open collector" type and may be connected together as shown in FIG. 29. A third signal, Mark Print Position, is derived from inverter 383 of FIG. 16 and is combined with the above described combination of signals to produce the display marker signals.

It is of course not desirable for the markings on the display to occur during the top 12 scan lines of the fourth display line, since characters may be displayed in this region. Therefore, the outputs of the NAND gate 650 and 651 are connected to a gating circuit 653 which blocks the signal except during the last 4 scan lines of the fourth display line, as described in the following paragraphs.

It will be recalled that the video blanking signal (FIG. 9) is generated during the last four lines of each 16 scan line group, for blanking the display device to provide space between each line of data. The video blanking signal shown in FIG. 29 is an input to AND gate 301 of FIG. 11, which inhibits the loading of video information in the shift register 269. One input to gate 218, then, is active during the last 4 scans of each data line, and used to enable the gating circuit 653, by turning off clamp transistor 656. The marker signals generated by gates 650 and 651 in combination are then applied to transistor 655 thus providing marker signals to a mixer 654. Shift register 269 provides dot information to mixer 654, which in turn modulates the video input to the display CRT.

Mixer 654 is comprised of two resistors. The values of the resistors may be controlled to vary the ratio of intensity between the displayed data and markers.

While many forms of circuits may be employed for enabling the marking signals, in the arrangement illustrated, a transistor 655 has its emitter connected to the supply, its collector connected to the mixer 654 and its base connected to the outputs of the NAND gates 650 and 651. A second transistor 656 has its emitter-collector path connected between the base and emitter of the transistor 655, with the base of the transistor 655 being connected to the output of the gate 219.

SPACE AND BACKSPACE REPEAT CIRCUIT

In a further advantageous feature in accordance with the invention, spacing and backspacing are effected repetitively, without the necessity for continual manipulation by an operator. In other words, in accordance with the invention, upon depression of the space or backspace key by an operator, the space and backspace functions are effected as above discussed, for one time. If, however, the operator has not released the corresponding key after a determined time, for example, the maximum time that an operator would be expected to hold a key depressed, then the system is reactivated to repeat the selected function at a rapid rate until the space or backspace key is released.

A circuit for effecting this result is illustrated in FIG. 30. Essentially, the circuit is comprised of a monostable multivibrator 675 activated in response to depression of the space and backspace keys, the multivibrator having a timing circuit which is initially relatively long, but which upon repeated cycling of 675 is much shorter. The output of the multivibrator is applied to a differentiator 676, and then by way of a NAND gate 677 to the disable input of the keyboard, for example, by way of an isolating diode 678, to isolate this circuit from the keyboard disable function previously discussed. The NAND gate 677 is enabled only when the space and backspace key are depressed.

In one embodiment of this feature, as illustrated in FIG. 30, the decoder 256 (see FIG. 10) has an output 679, which has a "low" logic level for space codes, and this output is applied by way of an inverter 680 to one input of AND gate 681. A further output 682 of the decoder 256, which has a "high" logic level for both space and backspace codes, is applied to the other input of the AND gate 681. This output is also applied to the NAND gate 677.

The monostable multivibrator is a type SN 74121, for example, wherein the Function Strobe signal and output 682 from the decoder were applied to terminals 3 and 4 connected to separate inputs of an internal OR gate, and the output of the AND gate 681 was connected to the terminal 5, the multivibrator having an internal AND gate with one input connected to the terminal 5 and the other connected to the output of the internal OR gate. The external timing circuit connected to the multivibrator, between terminals 10 and 11 comprise a capacitor 683 connected directly between these terminals and a capacitor 684 connected in series with the parallel combination of a diode 685 and resistor 686 also being connected between these terminals. With this arrangement, the timing circuit has different charging and discharging rates, whereby the capacitor 684 of the timing circuit is selected for the initial long delay, allowing sufficient time for the normal release of the space or backspace keys.

Holding either the space or backspace key causes repeated activation of the multivibrator, resulting in shorter pulses at the output of the multivibrator. The operation of this circuit is illustrated in FIG. 31, wherein line a represents an extended depression of a space or backspace key. Line b represents the Q output of multivibrator 675, which, upon initial activation of the multivibrator, has a relatively long delay period 690. During the delay period 690, the keyboard is disabled, thereby disabling the outputs of the keyboard. Upon termination of the delay period 690, the keyboard is once again enabled, as indicated at 691 in line c of FIG. 31. This re-establishment of the keyboard outputs results in further activation of the monostable multivibrator, to perform a new delay timing cycle 692. This time is considerably shorter, since the timing capacitor 684 of the multivibrator has not fully discharged. This sequence of disabling and enabling the keyboard continues at a rapid rate, until the space or backspace key of the keyboard is released.

With this arrangement it is thus necessary only for the operator to maintain pressure on the selected key, in order to obtain repetitive operation, and control of the pressure is not required as in conventional repetitive operation systems.

AUDIO ALERT SYSTEM

As an aid in operating a typographic apparatus in accordance with the invention, distinctive audio signals are provided, to enable an operator to recognize clearly when the data entry position is in the justification area, and when the right margin has been reached or passed. Referring now to FIG. 32, the Coincidence signal is applied to the enable terminal of a D type edge-triggered flip flop 700, and the Right Margin signal is applied to the clock terminal of this flip flop. The $\bar{Q}$ output of this flip flop is applied to a base of a transistor 701 having a grounded collector. The emitter of the transistor is connected by way of isolating diode 702 and an audio tone generator 703 to the supply voltage. The Coincidence signal is also applied to a monostable multivibrator 704, such as a type SN 74121, and the justify area signal is applied to the enable terminal of this monostable multivibrator. The $\bar{Q}$ output of the multivibrator is connected by way of isolating diode 705 to the tone generator 703.

In this system, the multivibrator 704 is enabled when the data entry position extends into the justify area and at each occurrence of a Coincidence pulse in this area a pulse is produced at the output terminal of the multivibrator, the output pulses having durations dependent upon external timing capacitor 708. As a result, when the data entry position is in the justify area, a short audio tone pulse is generated by the tone generator 703, for every depression of a character key.

When the data entry position reaches the right margin, and the flip flop 700 is enabled by a Coincidence pulse, the Right Margin pulse changes the state of the flip flop 700, to render the transistor 701 conductive, and hence to provide a continuous tone output from the tone generator. Since Coincidence pulses occur only in scan lines of the data entry line, while Right Margin pulses occur in the scan lines of the other lines, a capacitor 707 is connected to the output of the transistor 701 to maintain the audio tone continuous throughout the scans of the display.

VISUAL ALERT SYSTEM

Also, in accordance with the invention, visual means are provided in the form of a row of lamps, FIG. 1, 107, to indicate to the operator the degree of penetration into the justify area. Referring again to FIG. 32, the justify area signal is applied to counter 710 by way of inverter 709. The $\bar{Q}$ output of flip flop 700 is applied to counter 710 to provide a count signal. The outputs of counter 710 are routed to a binary to decimal converter 711 which then provides signals to light the lamps of the display 107.

In accordance with the invention, the counter 710 is allowed to count only during the time data entry from the keyboard is occurring within the justify area. At all other times a signal from inverter 709 holds counter 710 reset. The same signal used to activate the audio alert system described above, provides a count pulse to counter 710. The counter output being in binary form is then decoded by 711 to produce discrete signals to sequentially illuminate the lamps of the display 107.

PRINTER OUTPUT

As discussed previously, the apparatus in accordance with the invention may be employed in combination with a printer, and the printer may be of conventional structure. Various printers require different control signals for operation, and it is beyond the scope of the disclosure, and not material to the above disclosed aspects of the present invention to discuss such printers in detail. The general interconnection of the apparatus of the invention with a printer, however, is illustrated in FIG. 33, wherein a plurality of signals derived as above described are applied to an interface 750. For example, the seven bit memory output from the multiplexer 260 of FIG. 10 will be necessary, and depending upon the requirements of the printer, the End Scan Line signal from the count detector 203 of FIG. 9, the Character Space Data signals from the end gate 356 of FIG. 13, the Decoder Clock from the NAND gate 329 of FIG. 13, the Backspace Inhibit signal from the NAND gate 453 of FIG. 18, the CR Complete signal from flip flop 425 of FIG. 18, the Load Printer signal from flip flop 582 of FIG. 23, and the Spacing Clock from the NAND gate 576 of FIG. 23, may be necessary for the control of the operation of the printer, of course, depending upon the requirements of the printer. An interlock signal is provided by the interface, for application to the AND gate 581 of FIG. 23, for blocking loading of the printer when the printer is not in a position to accept information.

In view of the difference between printers, of course, the design of the interface 750, in its use and combination of these various signals will vary. Dependent upon the requirements, the interface provided output signals to the printer 751 by way of multiconductor cable 752.

MISCELLANEOUS

The preceding disclosure has discussed the invention with respect to particular components and types of components. It will be apparent, of course, that the disclosure of such components is exemplary only, and that the invention is fully applicable in the use of other types of components.

For example, a number of different types of display systems are currently known, and may be substituted for the disclosed CRT display. These include various display panels consisting, for example, of a gas-filled display matrix, which may provide a dot matrix display employing individual light-emitting-elements. Dot matrix displays of the scanning type may also employ other light-modifying devices, such as liquid crystals, and the scanning and modulation of such displays is known in the art. Further, it is not necessary, in accordance with the broad features of the invention, that the display be a dot matrix display, since the display may be formed of bars, segments or the like. The invention is, of course, equally applicable to other types of displays and not specifically to those mentioned above.

It is therefore intended in the following claims to cover each such variation and modification as falls within the true spirit and scope of the claims.

What is claimed is:

1. An electronic typographical device, comprising:

a keyboard having character keys for producing character code signals, a space key for producing a space code signal, and a backspace key for producing a backspace code signal;

an electronic display device responsive to said character and space code signals for displaying characters and for moving the print point of said display device by a predetermined distance increment in response to each one of said character, space and backspace code signals;

timing means coupled to said keyboard for generating a keyboard control signal so long as any one of said keys is depressed, said control signal having an initial delay interval for disabling said keyboard, said initial delay interval being greater than a maximum preselected time that an operator would normally be expected to hold a key depressed, said control signal initial delay interval being followed by a series of keyboard enabling and disabling pulses at a rapid rate, to cause said keyboard to produce a series of code signals corresponding to said one key, when said any one key is depressed for a time interval greater than said maximum preselected time, whereby said display device responds to said code signals by displaying a corresponding series of characters or spaces as though said any one key had been repeatedly depressed.

* * * * *